(12) United States Patent
Inuzuka et al.

(10) Patent No.: US 7,369,284 B1
(45) Date of Patent: May 6, 2008

(54) IMAGE SIGNAL PROCESSING METHOD, IMAGE SIGNAL PROCESSING DEVICE, AND IMAGE SIGNAL PROCESSING SYSTEM

(75) Inventors: Tatsuki Inuzuka, Mito (JP); Yasutaka Toyoda, Hitachi (JP)

(73) Assignee: Ricoh Printing Systems Ltd., Tokyo (JP)

( * ) Notice: Subject to any disclaimer, the term of this patent is extended or adjusted under 35 U.S.C. 154(b) by 0 days.

(21) Appl. No.: 10/257,253

(22) PCT Filed: Apr. 12, 2000

(86) PCT No.: PCT/JP00/02374

§ 371 (c)(1),
(2), (4) Date: Oct. 10, 2002

(87) PCT Pub. No.: WO01/84851

PCT Pub. Date: Nov. 8, 2001

(51) Int. Cl.
*H04N 1/46* (2006.01)
(52) U.S. Cl. .................. 358/512; 358/515; 358/525; 358/539
(58) Field of Classification Search ........... 358/512, 358/515, 525, 539, 530
See application file for complete search history.

(56) References Cited

U.S. PATENT DOCUMENTS

| | | | | |
|---|---|---|---|---|
| 4,716,456 A | * | 12/1987 | Hosaka | 358/509 |
| 5,583,656 A | * | 12/1996 | Gandhi et al. | 382/234 |
| 5,710,577 A | * | 1/1998 | Laumeyer | 345/548 |
| 5,828,848 A | * | 10/1998 | MacCormack et al. | 709/247 |
| 6,556,195 B1 | * | 4/2003 | Totsuka et al. | 345/419 |

FOREIGN PATENT DOCUMENTS

| | | |
|---|---|---|
| JP | 2-92181 | 3/1990 |
| JP | 11-168745 | 6/1999 |
| JP | 11-196429 | 7/1999 |
| JP | 11-341295 | 12/1999 |

\* cited by examiner

*Primary Examiner*—Houshang Safaipour
(74) *Attorney, Agent, or Firm*—McDermott Will & Emery LLP

(57) ABSTRACT

A color image signal processing device having a high resolution and excellent color reproducibility even though the device comprises a one-chip color sensor. The data format for transmitting image information inputted through an input unit to an output unit includes information on the arrangement of the color filter of the input unit and on the characteristics of the color filter.

3 Claims, 29 Drawing Sheets s: KIND OF COLOR FILTER ($s \geq 3$)
t: KIND OF COLOR SIGNAL TO BE OUTPUT ($t \geq 1$)

s: KIND OF COLOR FILTER ($s \geq 3$)
t: KIND OF COLOR SIGNAL TO BE OUTPUT ($t \geq 1$)

FIG. 3

| ITEM | EXAMPLE |
|---|---|
| (1) STRUCTURE INFORMATION OF PLANE SENSOR | NUMBER OF PIXEL:V 1024 X H 1024 PIXELS ARRANGEMENT PITCCH:V 4 $\mu$m X H 4$\mu$m OPENING RATIO:70% OF ARRANGED AREA |
| (2) ARRANGEMENT ORDER OF COLOR FILTER | TAKING FOUR PIXELS VERTICALLY AND HORIZONTALLY ARRANGED AS UNIT BLOCK,UPPER-LEFT:R,UPPER-RIGHT:G, LOWER-LEFT:G,LOWER-LEFT:B |
| (3) SPECTRUM DISTRIBUTION OF COLOR FILTER | 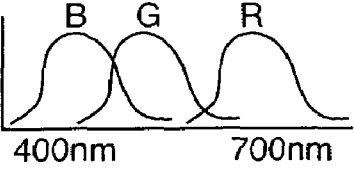 |
| (4) SENSING CHARACTERISTICS OF PLANE SENSOR | FLUCTUATION IN SENSITIVITY OF EACH PIXEL IN PLANE,SPECTRUM DISTRIBUTION OF OPTOELECTRIC CONVERSION ELEMENT AND SO ON |

BLOCK(RGB FILTER)

COMBINATION OF PIXELS FORMING COLOR VECTOR

FIG. 26
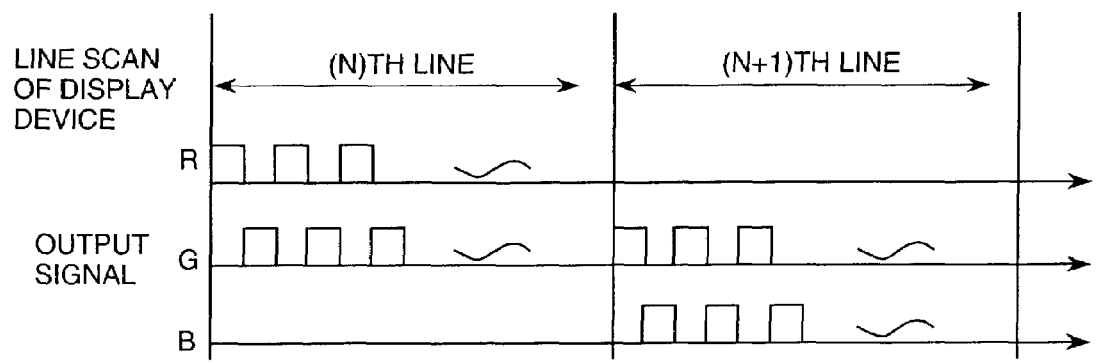
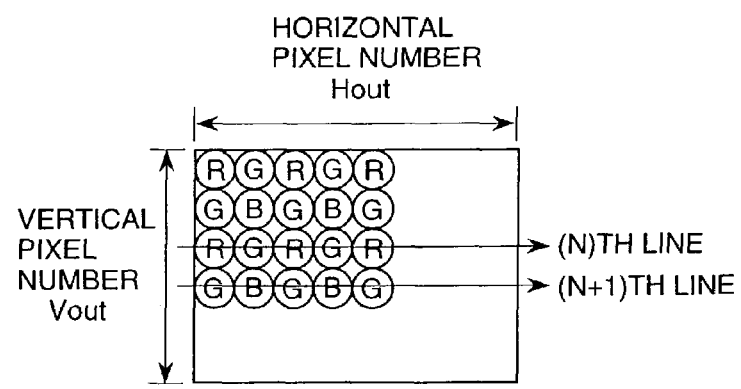

FIG. 29
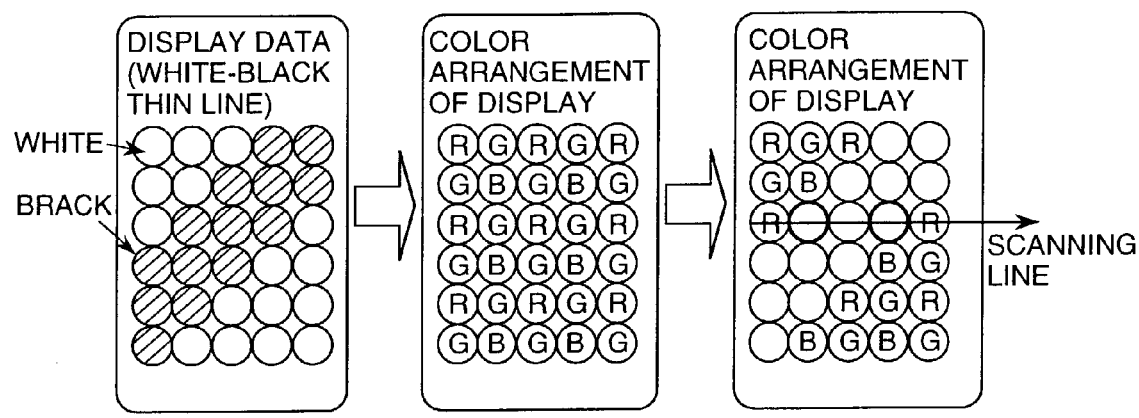
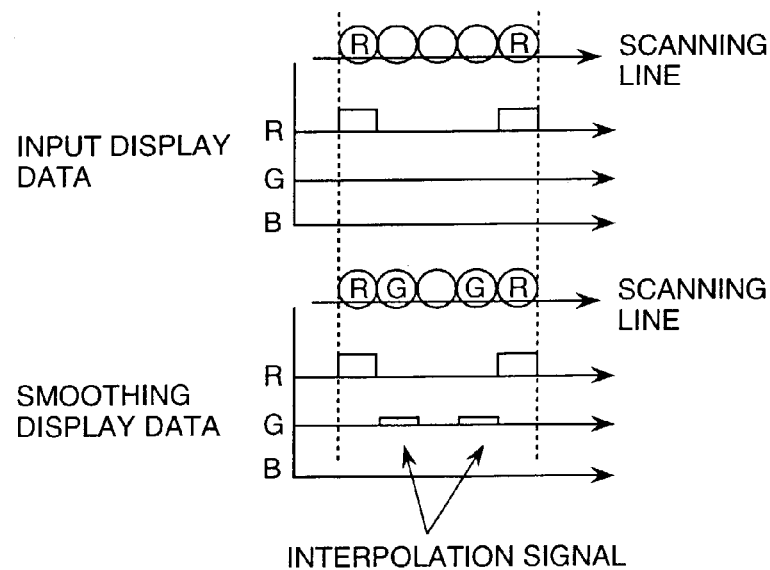
INTERPOLATION SIGNAL

FIG. 30
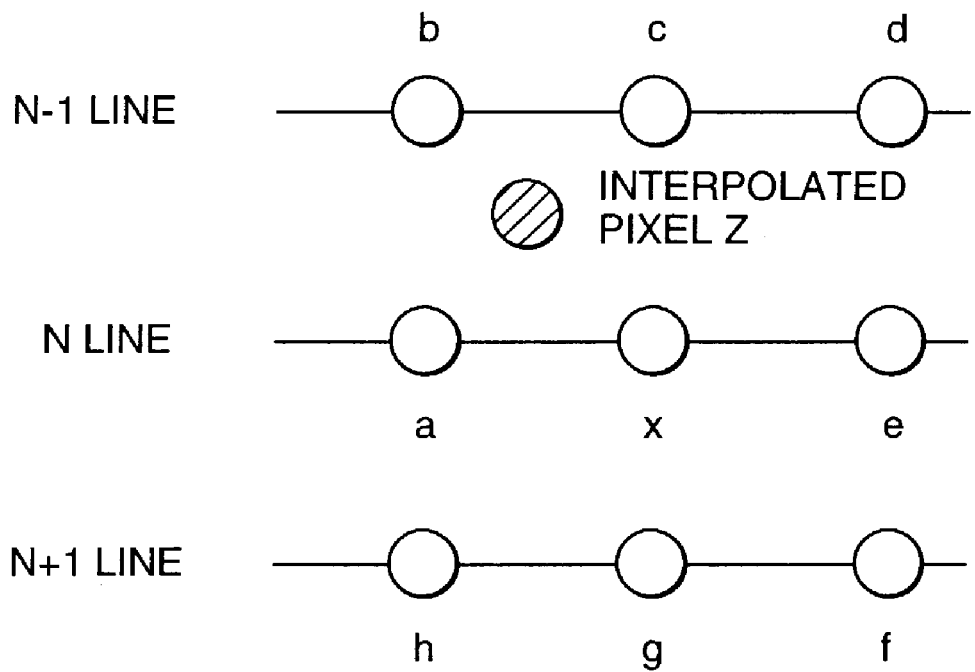
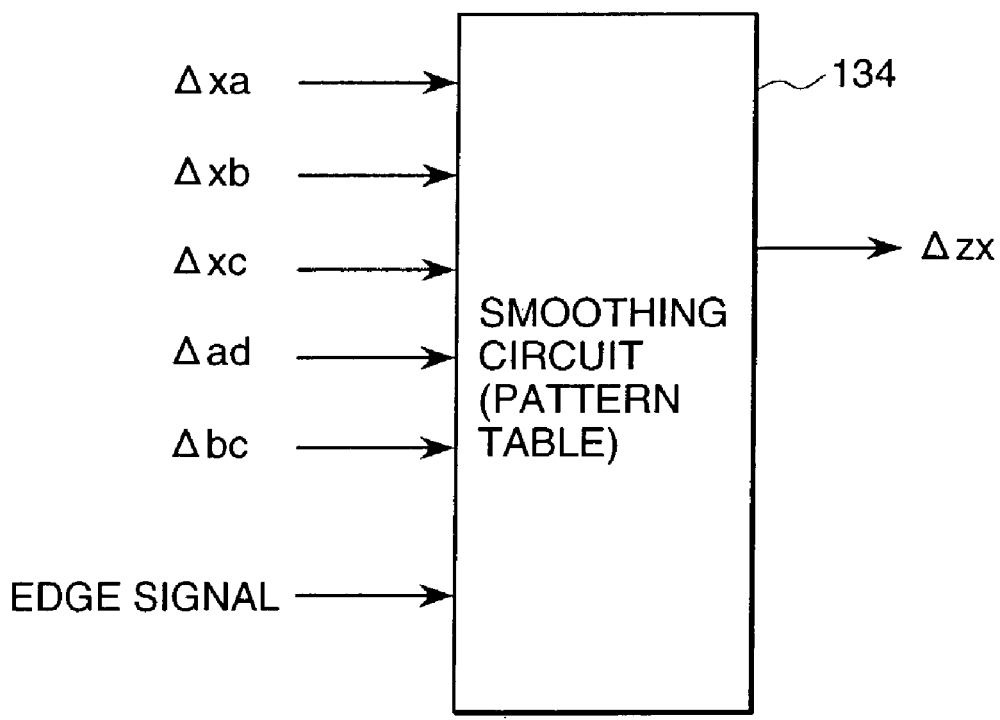

IMAGE SIGNAL PROCESSING METHOD, IMAGE SIGNAL PROCESSING DEVICE, AND IMAGE SIGNAL PROCESSING SYSTEM

TECHNICAL FIELD

The present invention relates to an image processing apparatus. More particularly, the invention relates to an apparatus for performing signal processing of a color image signal, such as input, compression, accumulation, color conversion, displaying and so forth.

BACKGROUND ART

As typical equipments of an image input device, digital cameras are spreading. Concerning this technology, there has been introduced as a feature story in a magazine "Electronics", Ohm K. K., Vol. 43, January (1998). As a single-plate type CCD sensor to be employed in the digital camera and so forth takes an optoelectric conversion element consisted of a combination of a photodiode and a capacitor, as a pixel, and converts a distribution of light projected on a plane into an electric signal by arranging a plurality of pixels on one substrate. Upon inputting a color image, s kinds of color signals having mutually different spectrum distribution are produced utilizing means, such as s kinds of color filters, dichroic mirror or so forth. As a device construction for inputting s kinds of color signals using a plurality of CCD sensors, respective s in number of CCD sensor may pick-up s kinds of color signals by arranging respective color filters of s in number of CCD sensors, for example.

On the other hand, as device construction for inputting s kinds of color signal utilizing the single-plate type CCD sensor, s kind of color signals can be picked-up by providing s kinds of color filters to each pixels (optoelectric conversion element). As signal conversion means for generating s kinds of color signals in each pixel using the color signal picked-up by the CCD sensor, a dedicated signal processing LSI for processing in a stage of analog signal output from the CCD has been manufactured and marketed. The color signal input by the color sensor us stored in the memory or output externally after conversion into YC signal (luminance Y and color difference signals Cr and Cb), for example.

Here, for data format of the color signal including the YC signal, there is a system defined by standardization of a television broadcasting equipments, established in Recommendation ITU-R BT, 601-5—"Studio Encoding Parameters of Digital Television for Standard 4:3 and Wide-Screen 16:9", for example, as recommendation of international organization ITU-R (International Telecommunication Union). According to the standardized system, at first, there are provision for the color signal and provision for the image size, and setting of the color signal corresponding to number of pixels is determined. As one example, the color signal is consisted of three kinds (s=3), i.e., the luminance Y and the color difference signals Cr and Cb. The color difference signal can be sub-sampled in equal number of the number of pixels or lesser number than the number of pixels. Namely, concerning four pixels, it can be a format containing four Y, four Cr and four Cb may be set, or, in the alternative, a format containing four Y, one Cr and one Cb may be set. Aggregating these provisions, it is premised to the number of pixels consisting a broadcasting screen image, and the color signal is defined on the basis thereof.

On the other hand, it has been generally known that a degradation component called as return frequency can be generated unless a relationship of a sampling frequency fsample and a frequency of an output color signal fcolor (fsample/2)>fcolor is satisfied on the basis of principle called as "sampling theorem". Accordingly, after execution of conversion of the color signal and so forth, a frequency filter is provided.

A concept of the color signal format follows a color signal format defined under JPEG (joint photograph expert group) known as compression method of the color image. In this case, number of pixels forming the screen image can be arbitrarily set. However, corresponding relationship between the pixel and the color signal is set by the same setting method of the case if television.

On the other hand, a technology for improving resolution of a single-plate type color sensor has been disclosed in Tamura and Matoba, "High Definition Pixel Interpolation Method by Single-Plate Color CCD Input", The Institute of Electronics. Information and Communication Engineers, 1998 National Conference Preliminary Report D-11-87 (March, 1998).

The image data is subject to color conversion of the color kind depending upon application. In case of printer, the input signal is converted into a color signal of CMY (cyan, magenta and yellow) and so forth time identifier use as control signal of ink amount. Conventionally, in order to perform color conversion, signal processing is performed on the basis of preliminarily prepared conversion formula or conversion table. Then, in order to realize reproduction ability of color not depending upon equipment characteristics of input device, it has been known ICC specification defined by ICC (International Color Consorium).

DISCLOSURE OF THE INVENTION

In the foregoing prior art, signal conversion has been performed for the purpose of not depending upon characteristics of input devices and output devices in handling of an image signal, such as color image and so forth. For example, as standard signal format, an image signal resulting from conversion process is used.

However, the pixel and color signal forming the screen image depend on the structure of the foregoing color CCD sensor. In order to adapt a sensor output signal to the format of the color signal, the signal conversion process is inherent. Furthermore, a problem in increasing of data amount can be encountered. In particular example, for example, in the single-plate CCD sensor using the RGB filter, the sensor output signal is consisted of any one kind of the color signal of the RGB filter per one pixel. In order to express one pixel by Y, Cr and Cb signal on the basis of the format, converting means of the color signal is inherent, and the data amount is increased to be three times. Furthermore, the signal converting means encounters difficulty to consider signal relationship between adjacent pixels if signal conversion is performed in the stage that the sensor output is analog signal, to potentially cause degradation of resolution, for example.

Also, for the procedure to perform encoding process after generating s kinds of color signals per the pixel, process period inherently becomes long. On the other hand, in the foregoing example, encoding process has to be performed for the triplicated color signals to encounter the problems in that the encoded data cannot be reduced satisfactorily.

On the other hand, in the foregoing puiblication, resolution improving technology in Tamura and Matoba, "High Definition Pixel Interpolation Method by Single-Plate Color CCD Input", The Institute of Electronics. Information and Communication Engineers, 1998 National Conference Preliminary Report D-11-87 (March, 1998), is matching process using predetermined patterns and signal process based on the calculation formula and does not effectively use characteristics of the image signal. For instance, color drift at the edge portion is not considered.

On the other hand, when the frequency filter is provided in order to prevent occurrence of return frequency, it is possible to degrade original signal in some characteristics. On the other hand, frequency filtering means is constituted by an analog circuit or a digital circuit. Various types of circuit constructions have been proposed for realizing desired frequency characteristics. in order to realize signal processing with good characteristics, size of the circuit becomes large.

On the other hand, the color signal to be transferred from the input device to the output device has to be repeatedly subject to signal conversion adapted to standard format, for example, to be a cause of signal degradation. Even in color conversion process based on the foregoing ICC specification, arrangement of the pixels is not considered. It is premised that one pixel is consisted of a plurality of kinds of color signals. Therefore, in the process before performing standard method for realizing reproduction ability of colors, problems in occurrence of error in signal conversion, process period, color drift in the edge portion and so on can be encountered.

One object of the present invention is to provide a data format which can reduce data amount of the color signal corresponding to the image information and can shorten process period for simple structure, and an image processing system using the same.

Also, another object of the present invention is to provide an image reproducing apparatus which can perform signal processing, image display or recording of a high quality color image.

In order to accomplish the foregoing object, the present invention comprises the steps of reading an object to be read, and externally outputting a plurality of color signals output from image reading means as data format, in which filter means having a plurality of kinds of spectrum distribution is mounted on a plurality of optoelectric conversion elements on a plane, and color arrangement information indicative of a relationship between a plurality of optoelectric conversion elements and a plurality kinds of color filters.

The present invention also comprises reading an object to be read and outputting a plurality of color signals from image reading means having a plurality of kinds of spectrum distribution is mounted on a plurality of optoelectric conversion elements on a plane, outputting analog signals with AD conversion of the plurality of color signals, outputting an encoded color signal by encoding the analog signals, storing the encoded color signals in a memory, and externally transmitting the plurality of stored color signals and color arrangement information indicative of a relationship between the plurality of optoelectric conversion elements and a plurality of kinds of color filters, by a transmitting portion.

On the other hand, the present invention comprises an input device having filter means of a plurality kinds of spectrum distributions in a plurality of optoelectrical conversion elements on a plane, a sensor reading an object to read and outputting a plurality of color signals, an AD converter for performing AD conversion of a plurality of color signals read by the sensor, an encoding circuit encoding a plurality AD converted color signals, a memory for storing a plurality of encoded color signals, and a transmitting portion for transmitting a plurality of color signal stored in the memory and a color arrangement information indicative of a relationship between the plurality of optoelectric conversion elements and a plurality of kinds of color filters, to an external device, and an output device including a decoding circuit for decoding a plurality of color signals transmitted from the transmitting portion of the input device, a color signal converting circuit converting a plurality of decoded color signals into a plurality of color signals different from the color signals, and a printing portion for displaying or printing the plurality of converted color signals.

On the other hand, the color signal converting circuit is input one kind color signal per one pixel and outputting a plurality of at least one kind of color signal per one pixel different from the input color signal.

With the construction set forth above, the image signal processing method and apparatus, and the image signal processing system having a data format which can reduce the data amount of the color signal corresponding to the image information and can shorten process period with simple construction, can be provided. On the other hand, it becomes possible to provide the image reproducing apparatus which can perform signal processing, image display or recording of high quality color image.

BRIEF DESCRIPTION OF THE DRAWINGS

FIG. 3 is an illustration showing one example of a content of a data format between an input device and an output device according to the present invention;

FIG. 26 is an illustration for explaining a pixel structure of a display device according to the present invention;

FIG. 29 is an illustration for explaining an operation of a smoothing display according to the present invention; and FIG. 30 is an illustration showing one embodiment of a smoothing circuit according to the present invention.

BEST MODE FOR IMPLEMENTING THE INVENTION

One embodiment of an image signal processing apparatus according to the present invention will be discussed hereinafter with reference to the accompanying drawings.

Figure 1A:
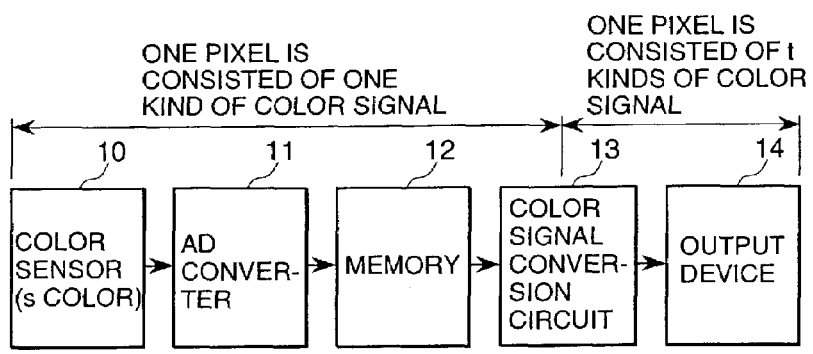
FIG. 1 is a schematic illustration showing general construction of an image signal processing system according to the present invention.

FIG. 1(a) shows one constructional example of an image processing system according to the present invention. By means of a color sensor 10 of image reading means, an image information of a reading object, such as document, drawings, scenery and so forth in a form of an analog signal, is input. A plurality of color signals corresponding to the input image information are converted into digital signals by an AD converter 11. The converted digital signals are stored in a memory 12. The color signals read out from the memory 12 is converted into color signals different from the input color signals by a color signal conversion circuit 13. The converted color signal is output to an output device as an external device, such as printer, facsimile and so forth. It is also possible to use a transfer portion after the memory 12 or to provide a transfer portion after the color signal conversion circuit 13 for transferring to the external device on output side.

Figure 1B:
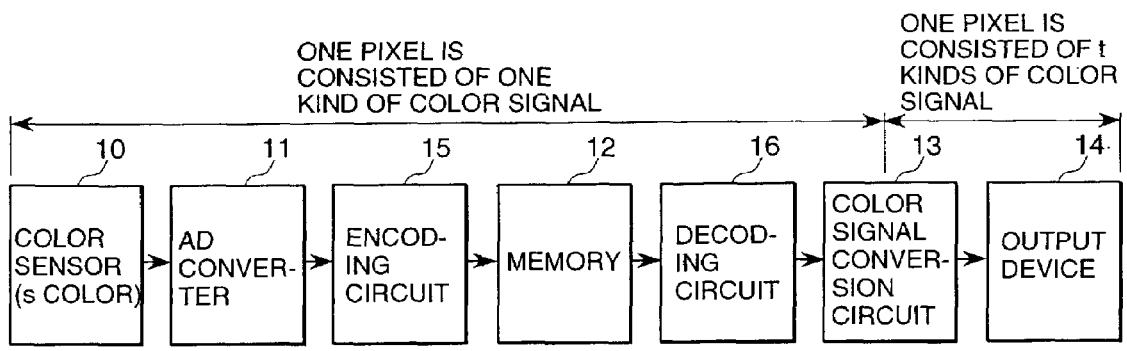

On the other hand, as shown in FIG. 1(b), it is possible to combine an encoding circuit 15 and a decoding circuit 16 for the purpose of reduction of data amount of the image signal to the foregoing system construction, and to arrange then before and after the memory 12.

A feature of the present invention is to provide a circuit construction operated with one kind of color signal per one pixel from reading out by the color sensor 10 to inputting to the color signal conversion circuit 13 for outputting or reproducing a high quality image data at high speed, since the color signals consisting one pixel with t ($t \geqq 1$) kinds are input to the output device 14.

The so-called single-plate type color sensor 10 has a construction for reading the color signal by regularly arranging s ($s \geqq 3$) kinds of color filters in respective of plurality of optoelectric conversion element arranged in a plane. For example, the CCD sensor converts a light amount received by each pixel into a charge amount by a combination of a photodiode and a capacitor for outputting the signals of the pixels in the plane by reading the charge amount in order. On the other hand, MOS sensor also constructed to read out the signal in order by a switching element after optoelectric conversion by the photodiodes, similarly. The circuit outputting the signals in order is often mounted on the same substrate as the sensor element. The present invention does not specify the circuit constriction and operation.

It should be noted that, in order to generate an image signal of two-dimensional plane, there are a system employing a plane type sensor arranged the optoelectric elements in two-dimensional arrangement and a system for relatively moving a line sensor, in which the optoelectric elements are arranged linearly, relative to an object. However, the present invention is not limited to these reading system.

In the foregoing discussion, a signal depending on a spectrum distribution characteristics of the color filter will be referred to as the color signal, and a unit corresponding to respective optoelectric conversion element will be referred to as pixel, and an aggregate of the read out pixels is referred to as an image. The color signals of the pixels forming the image is expressed by s kinds of color signals read out from the optoelectric conversion elements of the color sensor.

Figure 2:
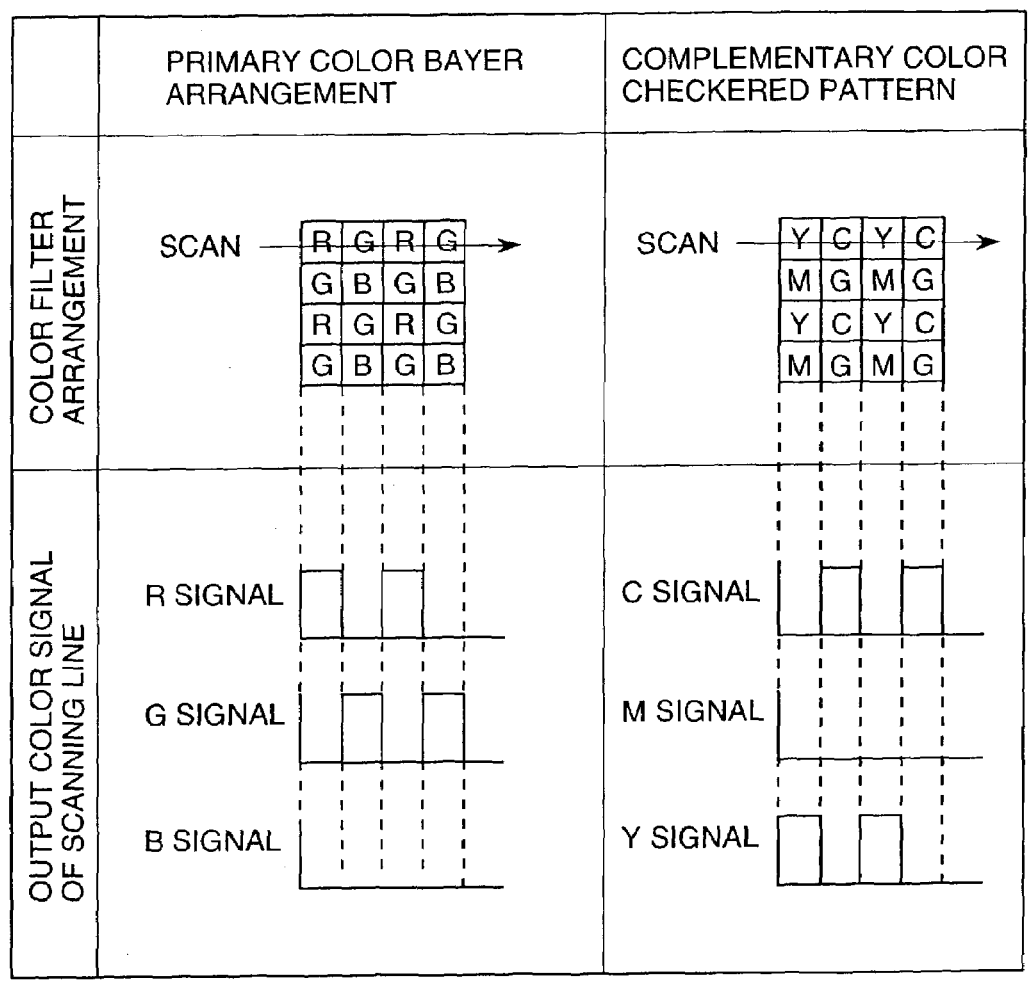
FIG. 2 is an illustration showing one embodiment of a color filter arrangement of a color sensor according to the present invention.

Since the single-plate color CCD sensor is formed by regularly arranging the color filters having s kinds of spectrum distribution respectively in the optoelectric element, one pixel is consisted of one kind of color signal. By combining s in number of pixels, s kinds of color signals can be generated. Spectrum distribution of the color filter to be used is RGB (red, green and blue), CMY (cyan, magenta and yellow) and so forth, for example. Arrangement of the color filters to be mounted on the pixels of the single-plate color CCD sensor is as shown in FIG. 2, for example. When the arrangement of the color filter is Bayer type, four pixels of vertical two pixels and horizontal two pixels, are arranged in pattern wherein one pixel having R (red) filter, two pixels having G (green) filter and one pixel having B (blue) filter are arranged. By reading out the color signals of these pixels, a color image data having one kind of color signal per one pixel can be input. Such arrangement pattern is determined upon designing the sensor per se. Accordingly, to which of s kinds, the color signal of each read out pixel corresponds is the characteristics judged from a design specification and so forth. The present invention uses the information of such positional relationship.

It should be appreciated that an optical system for focusing a light beam from an object is required. In the present invention, there is no particular constraint. On the other hand, strain of the optical system, sensitivity characteristics per pixel of the sensor and so forth can be corrected.

Figure 4:
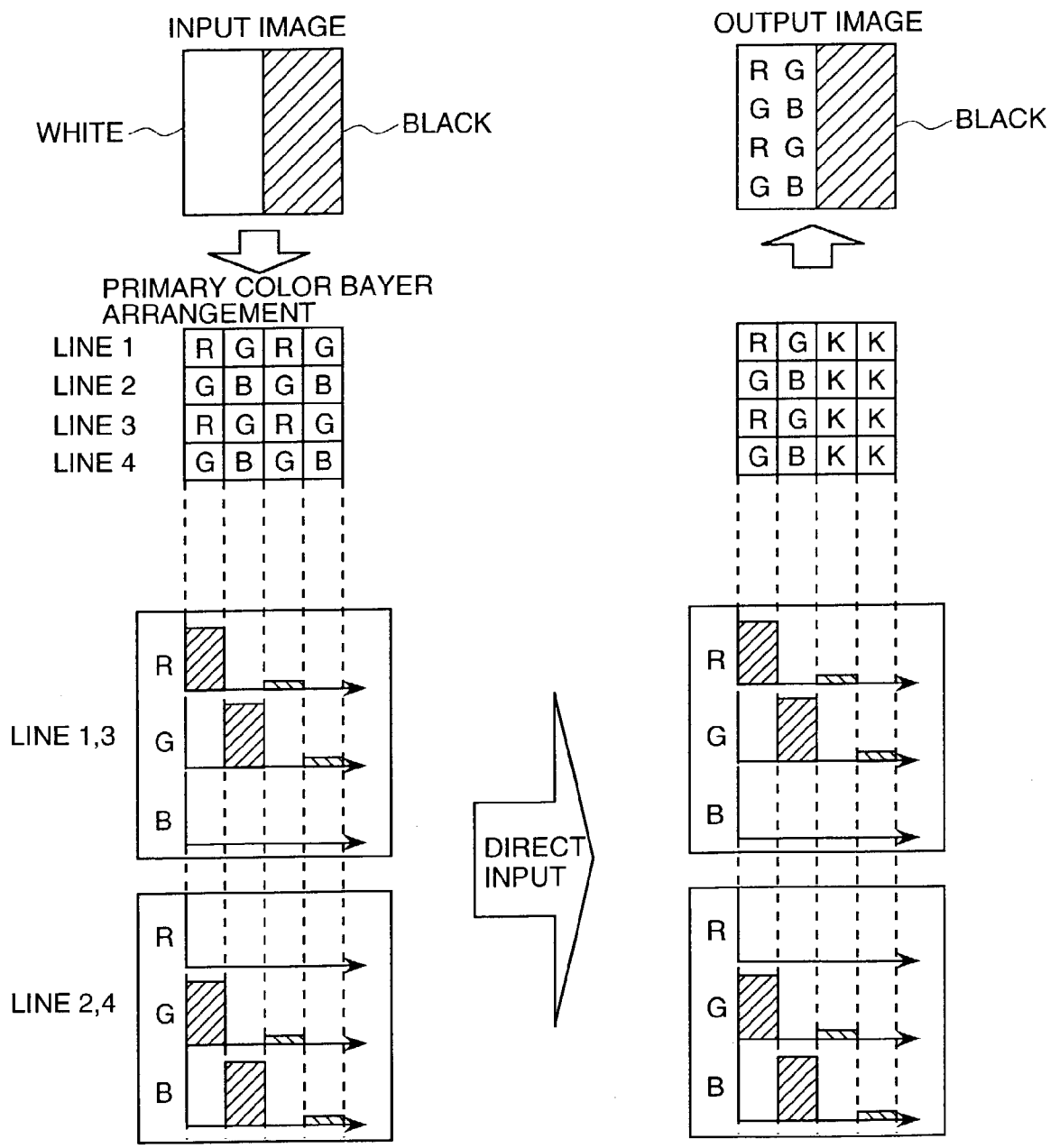
FIG. 4 is an illustration showing one embodiment of a read signal of the color sensor according to the present invention.
Figure 5:
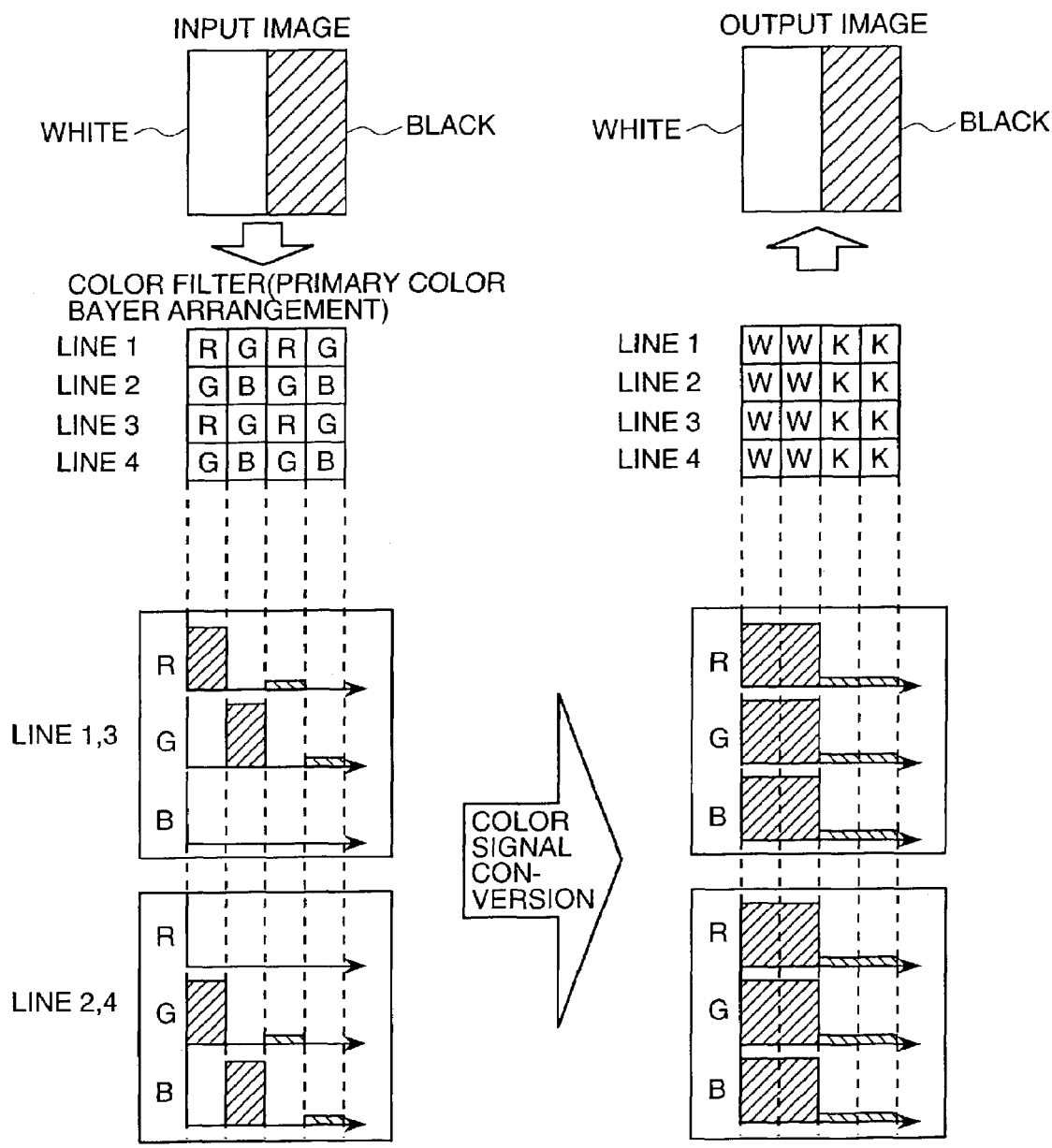
FIG. 5 is an illustration showing one embodiment of a color signal processing of the read signal of the color sensor according to the present invention.

The color signal thus read out from the color sensor 10 has only one color signal concerning the pixel at this timing determined by arrangement relationship between the pixel of the sensor and the color filter as shown in FIG. 4. Accordingly, when the color signal is output as is, even when the object of white and black is input, for example, respective RGB color signals are out per the pixels on the basis of the arrangement of the RGB color filters. For example, as luminance Y and color difference signals Cr and Cb are used as color signals in the standard ITU-R BT. 601-5 defined by ITU-R, when one pixel is expressed by s kinds (s=3 in case of RGB, CMY or so forth) as shown in FIG. 5, the color signal increases data amount to be triplicate. On the other hand, the method of color conversion may be implemented by the analog circuit, the digital circuit and so forth. Frequency limitation is given for the color signal to establish a relationship between a sampling frequency fsampe determined by the sensor arrangement and a frequency component fcolor satisfying the color signal sampling theorem (fsample/2)>fcolor.

The present invention is characterized by realizing high speed process and improvement in image quality utilizing arrangement information of the color filters of the input device, such as the color CCD sensor or the like, and characteristics information of the color filter (for example, spectrum distribution or color kind of RGB and so forth). Therefore, by containing arrangement information of the color filters in the foregoing input device and the characteristics information of the color filter in the data format between the input device and the output device 14, signal processing is performed utilizing one color signal per one pixel in the color signal processing. On the other hand, the encoding circuit 15 can reduce data amount by taking one color signal per pixel as encoding object. While there is no particular limitation in encoding system, a system based on difference encoding (for example, JPEG lossless mode set forth in ITU-T T.81 Recommendation or lossless compression system set forth in ITU-T T.87 Recommendation) and so forth can be used. Difference encoding is a step of deriving a difference value with adjacent color signal of the same kind, and replace with a code word thereafter. Then, by reading and decoding the stored code data from the memory, one color signal can be reproduced for one pixel. On the other hand, by utilizing the difference encoding as the encoding system, signal processing utilizing the difference signal derived from the code data can performed.

Figure 6:
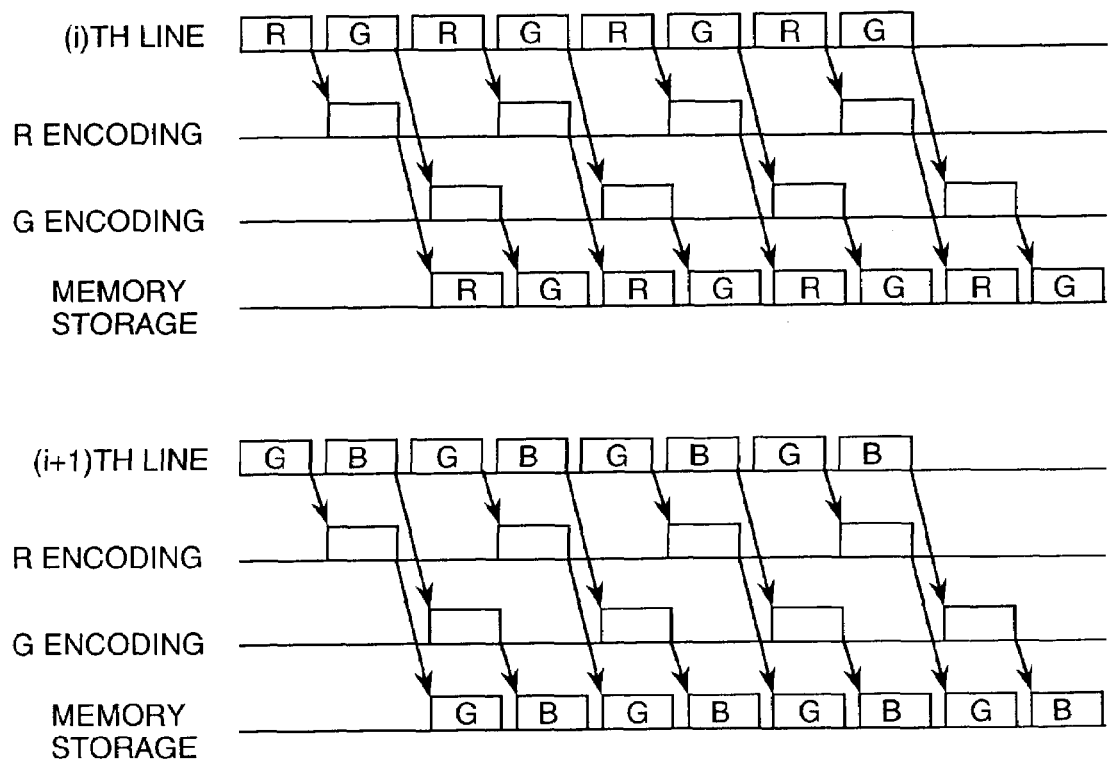
FIG. 6 is an illustration forming one example of a process timing chart of a color sensor signal of the present invention.

This process timing is shown in FIG. 6. On the basis of arrangement of the color filters in the color sensor 10, the color signal to be input is differentiated per line. For example, in case of a primary color Bayer arrangement as shown in FIG. 5, the color signals are input in sequential order of RGRG in first line, . . . , GBGB in (i+1)th line . . . Encoding process is performed adapting to the input timings of the color signals to accumulate in the memory 12. When the color signal accumulated in the memory is read out, the code data is read out from the memory 12 in the Step similar to the above to restore one pixel into one color signal by the decoding circuit 16. Then, using the color signal conversion circuit 13, t kinds of color signals per one pixel is generated using the color signal as output signal to the output device. For example, in case of the printer utilizing cyan, magenta, yellow and black inks, t becomes four.

Here, particular numerical example in the case where the color signal of an image size (640×480 pixels) called as VGA is shown. In the conventional system, upon input timing, when data compression is effected into one fifth by JPEG system (ITU-T T.81 Recommendation) after converting into three kinds of color signals of RGB per one pixel. data amount becomes 640×480×3×(1/5)=184,320. On the other hand, in the present invention, by expressing one pixel by one kind of color signal depending upon the color filter, and performing data compression into two third in the difference encoding system, the data amount becomes 640×480×1×(2/3)=204.800. Thus, both are substantially comparable in data amount. In the present invention, signal processing load is small and high-speed process can be realized by simple circuit construction. In the conventional system, a dedicated LSI is often employed for realizing JPEG system. However, in the present invention, associating with simplification of the circuit, the construction of the apparatus becomes compact and power saving can be achieved.

Hereinafter, particular circuit construction and process procedure will be discussed.

Figure 7:
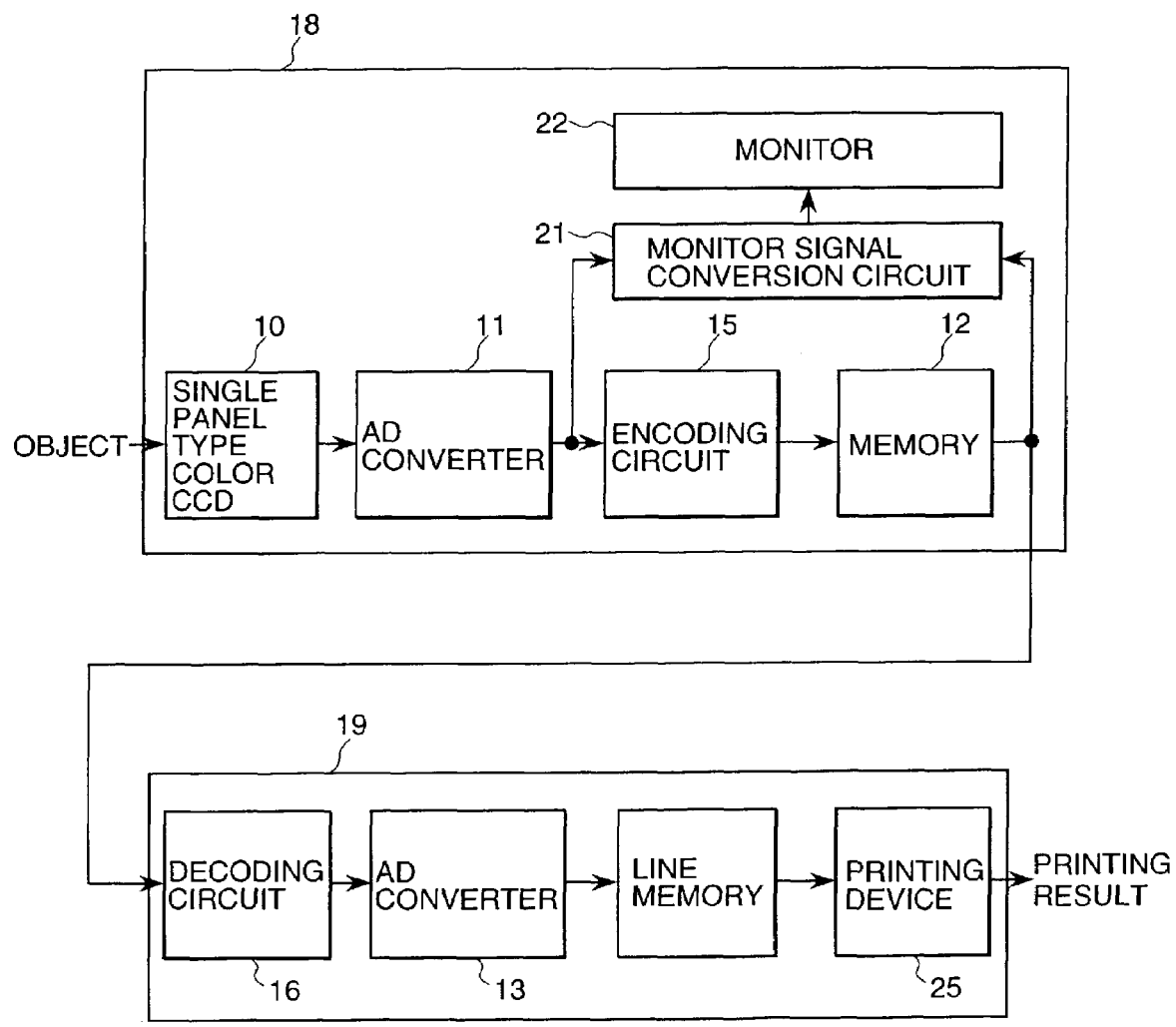
FIG. 7 is an illustration showing one embodiment of the image processing system according to the present invention.

With reference to FIG. 7, one embodiment of an image signal processing system constituted of a digital camera and a printer applied the present invention, and a signal processing procedure will be discussed.

The shown embodiment is assumed to a construction of the apparatus, in which the digital camera 18 and the printer 19 are connected directly, and construction and signal processing procedure to be implemented by the circuit within the printer.

A function of the digital camera 18 is to pick-up the object as an image signal by means of the color sensor 10, such as the single-plate color CCD or the like. The picked-up analog signal is converted into the digital signal by the AD converter 11. The digital signal is encoded by the encoding circuit 15. The encoded signal is stored in the memory 12. The signal; read from the memory 12 us transferred to the external device (for example, printer 19). Also, if required, the digital signal converted by the AD converter 11 and the encoded signal read from the memory 12 are converted into a signal form a monitor 22 by a monitor signal converting circuit 21 to output to the monitor for displaying.

On the other hand, a function of the printer 19 restores the image signal by the decoding circuit 16, performs conversion of the color signal, resolution and the signal level using the restored signal using the color signal conversion circuit 13, and performs printing by a printing process in the printing device 25, for printing the image signal received from the external device for printing.

Discussion will be given for apparatus construction and process procedure in detail for realizing the function.

The image signal stored in the memory 12 is one kind of color signal per pixel depending upon kind of the color filter of the color sensor. The color signal read out from the memory 12 to be output externally is one kind of color signal per the pixel. Since one pixel in the display screen of the monitor 22 can display only one kind of color signal, one kind of color signal read out from the memory 12 can be used as the color signal for display. Here, if number of pixels in the monitor is smaller than number of pixels stored in the memory, number of pixels is adapted in an appropriate method, such as sub-sampling or the like, using the monitor signal conversion circuit 21.

Figure 8A:
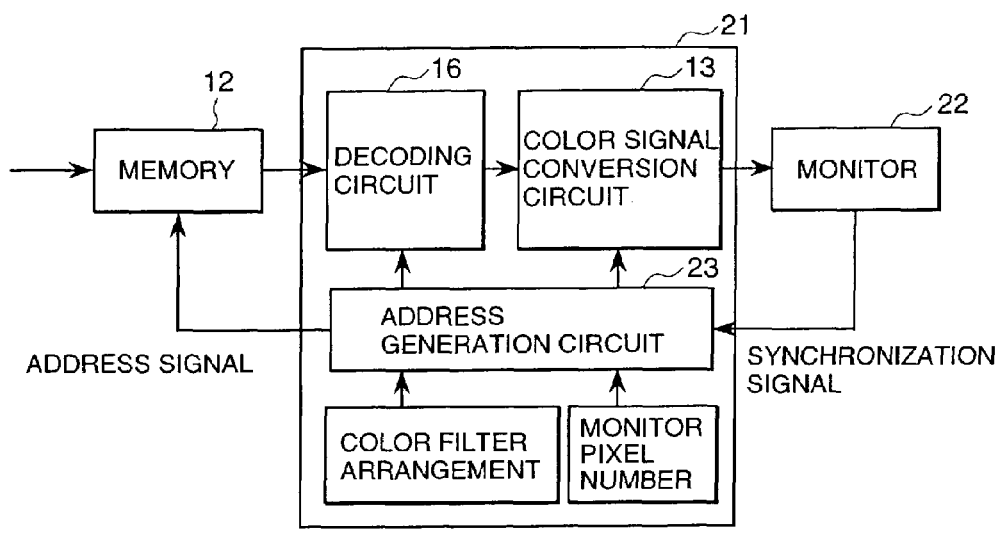
FIG. 8 is an illustration showing one example of construction of a monitor signal converting circuit according to the present invention.

One embodiment of the monitor signal converting circuit 21 is shown in FIG. 8(a).

Using an apparatus construction as shown in FIG. 8(a), the monitor signal conversion circuit 21 generates an address signal by an address generation circuit 23 for reading out from the memory 12 according to a display timing of the motor 22, and reads out the color signals from the memory 12. The display timing is a horizontal scanning signal and a vertical scanning signal in an example of CRT.

When the data to be stored in the memory 12 is the code data, the color signal is restored using the decoding circuit 16. Then, using the color signal conversion circuit 13, conversion into the color signal (e.g. RGB) to be used by the monitor 22 is performed and then is output to the monitor 22. By converting the color signal into the code data as set forth above, the data amount can be reduced.

Figure 8B:
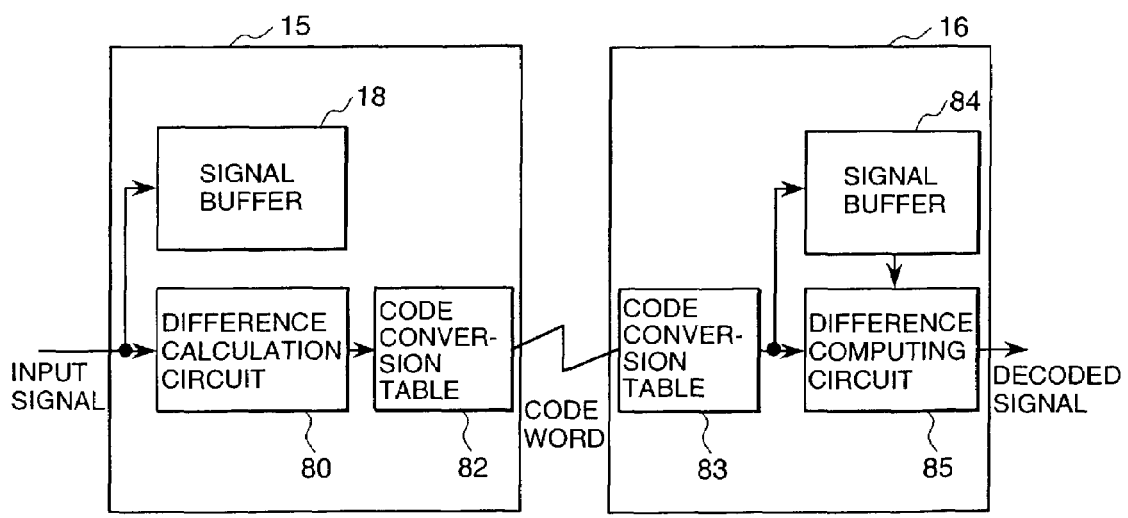

For example, in the construction of the encoding circuit 15 and the decoding circuit 16 as shown in FIG. 8(b), by deriving a difference with the adjacent pixel having the color signal of the same kind, conversion is performed into the code data. Here, in the encoding circuit 15, a signal buffer 81 is a memory for storing a comparison signal using a difference calculating circuit 80. High speed processing becomes possible by preliminarily setting the code data in a conversion table 82. On the other hand, the decoding circuit 16 for decoding the code data retrieves the difference value corresponding to the code data from a conversion table 83 and reads out a comparison signal of the difference value from a signal buffer 84. By deriving a value from both signals by a difference calculating circuit 85, the color signal is obtained. Since the procedure is simple as set forth above, it becomes possible to realize decoding of the color signal for monitor display on a liquid crystal display in synchronism with display speed for checking of the memory storage content and checking of the image pick-up condition. The memory 12 may solve the problem of waiting timing in memory access in both of reading out of the signal for monitor display and writing of the color signal from the color sensor in the memory with adjusting timing. Alternatively, the color signal for monitor display may be transmitted bypassing the memory 12.

By converting the code date, efficiency in memory accumulation can be improved. Also, number of output data to be output top the external equipment can be reduced. For example, upon perform data transmission by cable connection, shortening of the transfer period can be realized using the code data. In case of monitor display, by decoding the color signal in synchronism with the display speed, the memory for storing a bitmap data becomes unnecessary. On the other hand, by performing signal processing (edge enhancement, enlarging and contracting and so forth) utilizing the difference signal, high speed and simple apparatus construction can be realized.

The printer 19 receives the code data of the color signal and decodes the color signal using the decoding circuit 16. Here, in case of a printer mechanism receiving the color signal and, in conjunction therewith, to effect printing output, it becomes unnecessary to accumulate the code data of the entire image. In the alternative, it is also possible to transfer the code data from the digital camera in synchronism with printing operation of the printer. As set forth above, using the code data received or stored in the memory, resolution conversion is performed. The code data may be converted into the difference data using the conversion table.

A conversion rule for adoption of the pixel number and the color signal between the color sensor 10 and the monitor 22 is set in consideration of arrangement of respective color filters. The conversion of the color signal therebetween can be realized by the circuit construction based on simple calculation formula.

A storage circuit is incorporated in the color sensor 10, the monitor 22 and so forth, for preliminarily defining arrangement information of respective color signals in a read out procedure from the external device and reading according to the procedure. Thus, even when kind of the input device and the output device, such as the color sensor 10, the monitor 22 and so forth, the characteristics of respective devices can be read out to switch the signal processing procedure on the basis of the read out information.

Next, discussion will be given for a method of signal expansion into a plurality of kinds, such as RGB signal per pixel when one color signal is input per pixel using the single-plate type color CCD sensor, and construction of one apparatus.

Further discussion will be given for the signal processing, such as edge detection, enlarging and contracting and so forth using the color signal set forth above.

(1) Conversion of Color Signal

At first, when one color signal is input per pixel using the single-plate type color CCD sensor, discussion will given in connection with the method of signal conversion to a plurality of kinds, such as RGB signal and so forth per pixel and the construction of the apparatus. The process procedure discussed herein is to generate new signal using an arrangement pattern of the color signal of the adjacent pixels. Different from the case where the conventional frequency filter is used, it is one of merit not to be influenced by the return frequency based on sampling theorem.

At first, a step of executing the signal processing per pixel will be discussed.

Figure 9A:
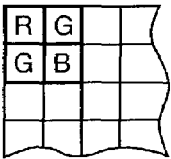
FIG. 9 is an illustration showing one embodiment of color signal processing of an edge portion according to the present invention.

FIG. 9A shows one example of process procedure of the case where the color signal of the object to pick-up is preliminarily set.

As a case where the color signal is preliminarily known, it may be the case that the object to pick-up contains particular character patterns written at particular position, such as a report format. In the alternative, it may be statistically deriving appearing color of the object to pick-up. Then, for example, discussion will be given herein for the case where the white and black document image as the object to pick-up is input by the color sensor 10. On the basis of arrangement of the RGB color filter of the color sensor 10, respective input image signals are the color signals based on the spectrum distribution of RGB. However, what is desired to be output is the image signal of the white and black document. Therefore, respective color signal is converted into a white and black signal. In the conversion process, since the conversion characteristics are differentiated at respective RGB, it is possible to use a preliminarily prepared conversion table, for example. This conversion table may be prepared on the basis of preliminarily measured data as a conversion characteristics curve for inputting the RGB signal from the sensor and outputting the white and black signal. Furthermore, when the output signal may be white and black binary signal, it may be required to prepare a threshold value for making judgment white or black concerning the RGB signal from the color sensor 10.

Furthermore, discussion will be given for the case where the object to be pick-up is red characters written on the white blank paper. Even in this case, it can be taken as color signal for only difference in amplitude value of respective color signals. For example, by using the conversion table, a red signal can be output. Here, when the red of the character pattern and the spectrum distribution of the R color filter are completely coincident with each other, the while blank as R color signal and the character pattern cannot be distinguished at all. However, since the ink material for printing and the filter material have different characteristics, the foregoing should happen as quite rare case. The probability of occurrence of the foregoing problem may be further lowered by providing a light source having a plurality of kinds of spectrum distribution for illuminating the object to pick-up and by picking up a plurality of kinds of image data with switching the light source.

On the other hand, using different color signal of the adjacent pixel and combining with smoothing process (smoothing of the contour) of the arrangement of the pixels, image quality of the read signal of the character pattern can be improved. The foregoing is shown the signal processing procedure suited for the case where the appearing color signals are known preliminarily. By this, RGB color signals can be derived with respect to all pixels of the single-plate type sensor and thus is advantageous in realizing high-resolution. For example, when image pick-up is performed by means of the color sensor having a million pixels, the color signals using all million pixels can be output.

In the foregoing disclosure is given for the case of so-called single-plate type color sensor, the foregoing is applicable even for an image input apparatus, in which a plurality of sensors are combined. For example, by combining the color signals output from the sensors of three kinds of color signals RGB and for the consistent pixel position, each pixel may have RGB signals. For this purpose, it becomes necessary to assemble so that the pixel positions of respective sensors are coincident with each other or are based on a given rule. However, using the present invention, in a three-plate type image input apparatus by assigning respective sensors of three kinds of color signals RGB, even if the positions of the pixels of the sensors inputting respective are not consistent with each other, the signal using the color signals of adjacent pixels can be reproduced as long as the positional relationship of respective sensors (namely position error) is known. Since assembling to make the pixel positions of respective sensors coincident with each other becomes unnecessary, it is advantageous in manufacturing cost lowering effect and capability of reproduction of the high resolution color signals. As another merit, by assembling so that the pixel positions of respective sensors are not consistent with each other, improvement of resolution can be realized by reproducing the color signals of respective pixels using the signal processing procedure according to the present invention. For instance, in case of the image pick-up device using three color sensors each having a million pixels, by assembling the sensors offsetting the pixel positions, the color signals corresponding to three millions pixels can be reproduced.

Next, concerning natural image containing large number of appearing color signals, conversion of the color signal will be discussed. For example, when the natural image and so forth is taken as object to pick-up, it appears that signal is varying per pixel. However, observing micro region, it can be regarded as combination of regions having particular color signals. Namely, concerning a simple model of the micro area, regions of two color signals separated by the edge portion may be considered. Discussion will be given here in after for the signal processing procedure on the basis of the model of division of region set forth above.

Figure 9B:
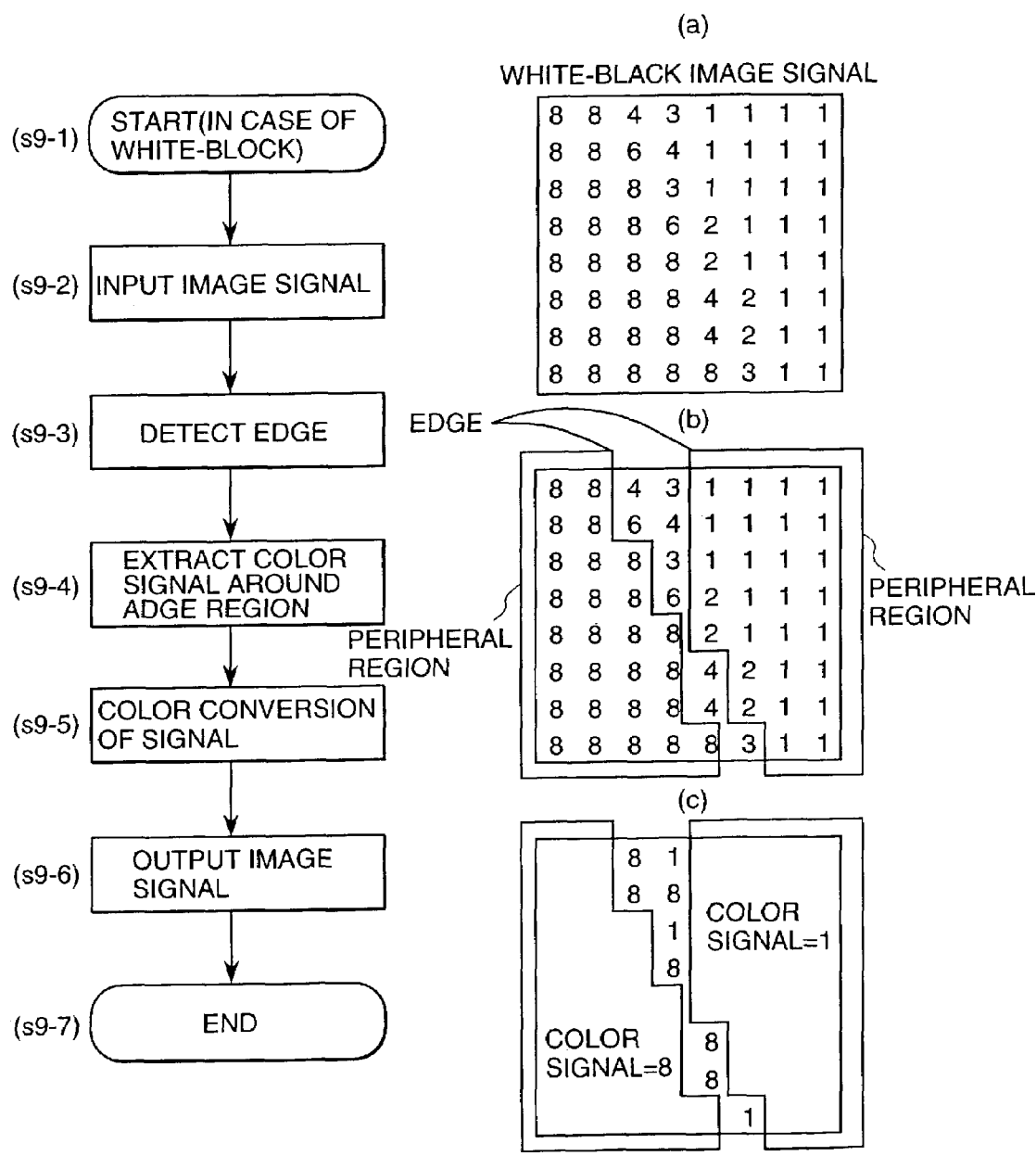

At first, FIG. 9B shows a color signal conversion Step using an edge signal as variation component of the signal.

(s9-1) Start: an objective image for discussing herein is assumed as white and black signal.

(s9-2) The white and black signal as illustrated in FIG. 9B(a) is input. Here is shown a region of eight pixels arranged vertically and horizontally shown a part of the screen. Figures in the drawing are color signal value of the white and black image signal.

(s9-3) Concerning the white and black image signal, when the color signal value is varied in the extent of 2 or more between adjacent pixels, edge detection is made by judgment that edge is prevent between the pixels (see FIG. 9B(b)).

(s9-4) As shown in FIG. 9B(b), around the detected edge portion, peripheral regions where the color signal value is relatively flat (variation is small), is present. The color signal values (signal value 8 and signal value 1) is extracted. On the other hand, the color signal located at the edge portion interposed between the peripheral regions has an intermediate level of the color signal values of the peripheral regions on both sides.

(s9-5) The color signal value positioned at the edge portion is replaced with the color signal value of the peripheral region (see FIG. 9B(c)) for correcting the characteristics of the image pick-up system. In FIG. 9B(c), there is shown an example, in which, for the pixel having the color signal value 4 or more positioned at the edge portion, the color signal value is replaced with the color signal value 8, and for the pixel having the color signal value less than 4 positioned at the edge portion, the color signal value is replaced by the color signal value 1.

(s9-6) The color signal value obtained through the foregoing step is output.

(s9-7) End: When the screen size is large, the foregoing step is executed over the entire screen. In the alternative, the entire screen is divided into a plurality of regions, each having pixels in the extent of eight arranged vertically and horizontally, and the foregoing procedure is performed for each divided region.

Next, using FIG. 10, concerning the case of the color image, discussion will be given for the color signal conversion step using the edge signal.

(s10-1) Start: it is assumed that arrangement of the color filters of the color sensor is based on RGB Bayer type as shown in FIG. 10(a).

(s10-2) The image signal is input. A region of 8 pixels arranged vertically and horizontally representative of a part of the screen is shown in FIG. 10(b). Figures in the drawing are the color signal values corresponding to the arrangement position of the color filters.

(s10-3) The color signal values is varied in the extent of 2 or more between adjacent pixels shown in FIG. 10(b). Edge detection is made by judgment that edge is located between the pixels.

(s10-4) The color signals of the peripheral region of the detected edge are extracted. Combining the kind of colors of the adjacent pixels, it is assumed that the color signals of the flat portions are (R, G, B)=(8, 8, 8) and (R, G, B)=1.

(s10-5) Concerning the pixel located at the edge portion, conversion is performed replacing the color signal of the peripheral region (see FIG. 10(c)). Concerning the pixels located at the edge portion, if the adjacent color signals are simply combined, it is possible that the color signal not originally present, such as (R, G, B)=(8, 1, 1), can be generated to cause degradation of the color signal. In FIG. 10(c), there is shown an example wherein if the color signal value of the edge portion is 4 or more, replacement is made with (R, G, B)=(8, 8, 8), and otherwise, replacement is made with (R. G, B)=(1, 1, 1). By such color signal conversion process, reproduction ability of the edge can be improved and resolution can be enhanced.

(s10-6) The color signals value obtained through the foregoing step are output. With employing the single plate type color sensor, a performance comparable with the case where a plurality of color sensors are used, can be realized.

(10-7) End: When the screen size is large, the foregoing step is executed over the entire screen. In the alternative, the entire screen is divided into a plurality of regions, each having pixels in the extent of eight arranged vertically and horizontally, and the foregoing step is performed for each divided region.

By incorporating or combining with the image pick-up device, such as the digital camera, for example, high-resolution picked-up date can be obtained. On the other hand, these signal processing may be established as a program and may be performed by software process using the signal processing processor.

The foregoing is to derive the value of residual color signal using the color signal contained in the concerned pixel after observing the RGB signals adjacent the concerned pixel and deriving a ratio.

(Step 1) On the basis of the RGB color arrangement of the sensor, combination block of the RGB signals is set. In case of the RGB Bayer type arrangement, a block configuration containing one pixel of R signal, two pixels of G signal and one pixel of B signal may be employed in the block.

(Step 2) For example, statistical process (for example, measurement of the maximum and minimum values) of the R signal of the concerned pixel and a plurality of adjacent R signals is performed. Then, when signal variation greater than or equal to a given value is present around the concerned pixel, judgment is made that edge is present within the region of the concerned pixel and the adjacent pixel. Furthermore. on the basis of the positional relationship between the concerned pixel and the adjacent pixel, the position of the edge may also be measured. Similar process is performed for G and B signals. Presence and absence of the edge measured for one of the RGB signals and result from the positional relationship may be commonly used for all of color signals.

(Step 3) An average value of the R signals not containing the edge portion around the concerned pixel is calculated. When judgment is made that edge is present in the vicinity of the concerned pixel, the R signals of adjacent pixels of the region not containing the edge are used. On the other hand, if judgment is made that edge is not present, the R signal of the concerned pixel and the R signals of the adjacent pixels are used. Similar process is also performed even for the G and B signals Thus, an average ratio of the RGB signal of the peripheral region (or block) including the concerned pixel can be derived.

(Step 4) Multiplying the color signal of the concerned pixel by the ratio derives the RGB signal. Even when the concerned pixel is the R signal, the ratio of the RGB signals can be calculated through the foregoing step. Therefore, multiplying the R signal by the ratio, the G signal and the B signal can be calculated. It should be noted that when the concerned pixel is position just on the edge, other step is used, such as the average value of the color signal of the regions adjacent the edge as the color signal of the pixel.

If it is preliminarily seen that the object to pick-up is the white and black image, a ratio of the RGB signal is constant. Therefore, instead of deriving the color signal values of the peripheral regions of the edge in the foregoing step, it may be set (R:G:B)=(1:1:1). On the other hand, similarly, if it is preliminarily seen that kinds of the appearing colors is limited number, such as white, black, red, blue and so forth, the ratio of the color signal (R:G:B) can be set preliminarily for selecting distribution of the color signal around the concerned pixel. Most of documents used in the office are printed by limited number of colors. Therefore, by using the foregoing step, high resolution color signal may be generated. By this, using the image input device, such as digital camera using the single-plate type color CCD sensor, high definition image input can be realized.

Next, a color signal converting process procedure including selection step of the operator will be summarized.

(s11-1) Start (s11-2) For example, the kinds of the color signals contained in the image signal can be preliminarily limited, such as when an image is generated by an application software of a personal computer (e.g. word processor, spreadsheet software and so on), when the operator reads particular kind of documents (literature, document and so forth) using a scanner or other cases, it is possible to preliminarily prepare the color signals as candidate colors. In this case, it becomes unnecessary to detect the color signals in the peripheral region of the edge as shown in FIGS. 9 and 10, and the closest color signals among the candidate colors can be selected and used.

(s10-3) In addition to the candidate color prepared by the application software, when the operator generates the image data using the color signal set by the operation, set color signal can be used.

(s10-4) Setting of the color signal by pre-scan. Using the input image signal, the statistical value (e.g. histogram or the like) of kinds of colors appearing over the entire screen is derived to use the kind of colors having high frequency of appearance.

Figure 10:
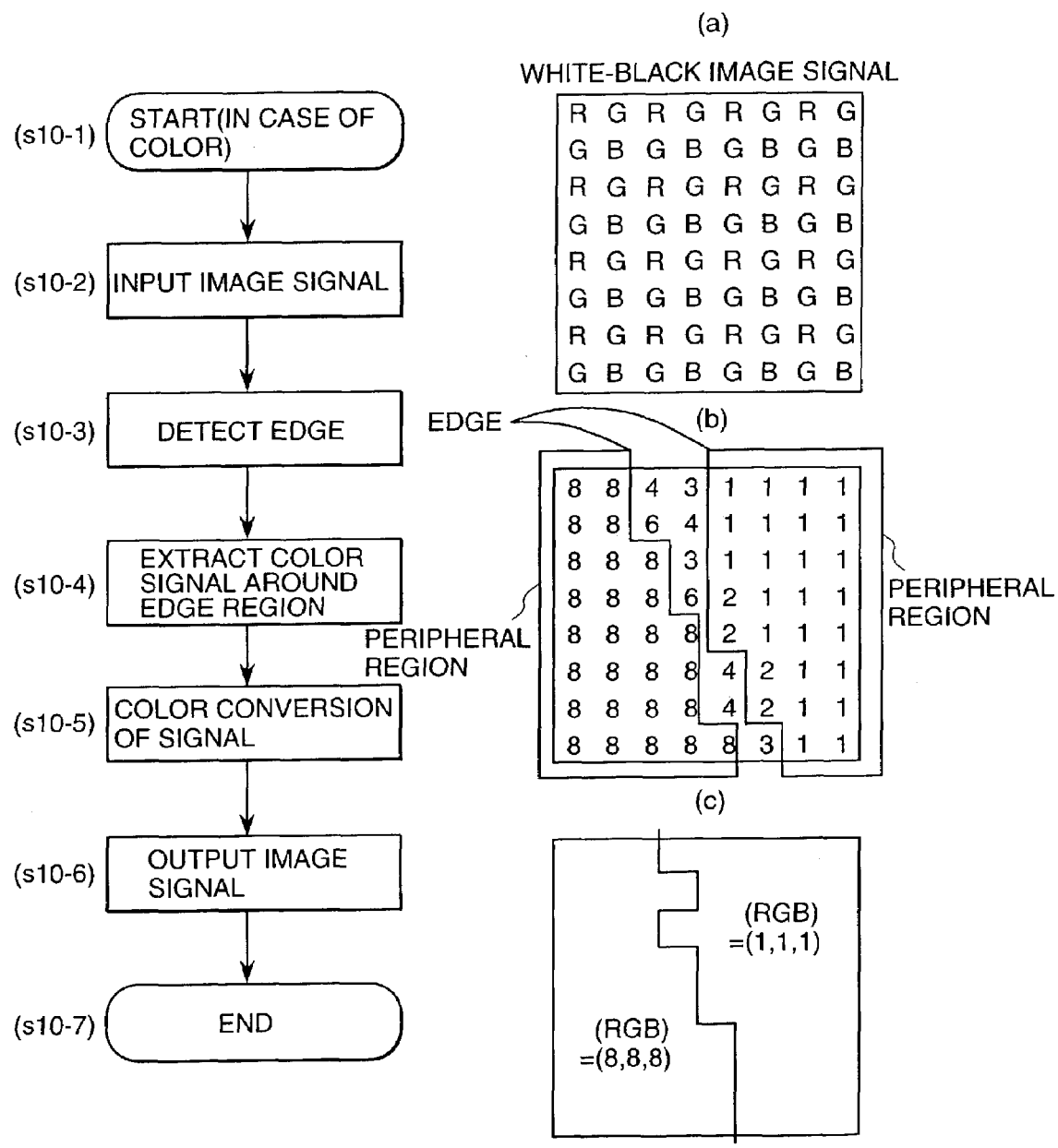
FIG. 10 is an illustration showing another embodiment of the color signal processing of the edge portion according to the present invention.
Figure 11:
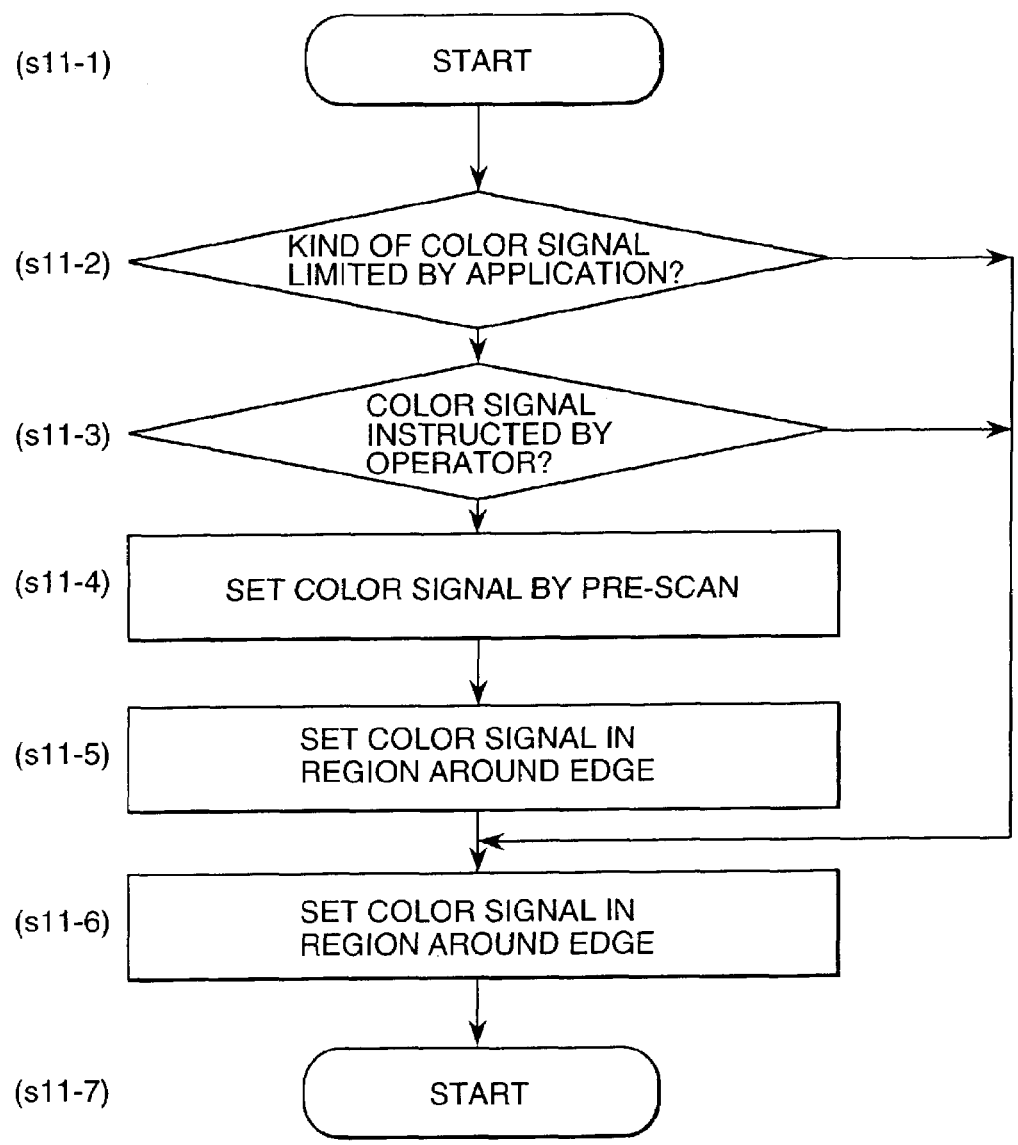
FIG. 11 is an illustration showing a flowchart of a color signal processing procedure of the edge portion of the present invention.

(s10-5) On the other hand, as shown in FIGS. 9B and 10, on the basis of the result of edge detection, the color signal of the peripheral region of the edge portion is detected and used.

(s10-6) Using the color signal set by any one of steps (s10-2), (s10-3), (s10-4) and ¥(s10-5), the color signal of each pixel is set.

(s10-5) End

In the foregoing step, when s kind of color signals are generated by combining adjacent pixels, it becomes necessary to set manner of combination of adjacent pixels. In case of the RGB Bayer type, combinations (blocks) of a plurality of adjacent pixels shown in FIG. 12 can be established. In the image region having small signal amplitude, substantially the same color signal value can be attained using any of the combinations shown in (1) to (8) of FIG. 12.

Figure 13:
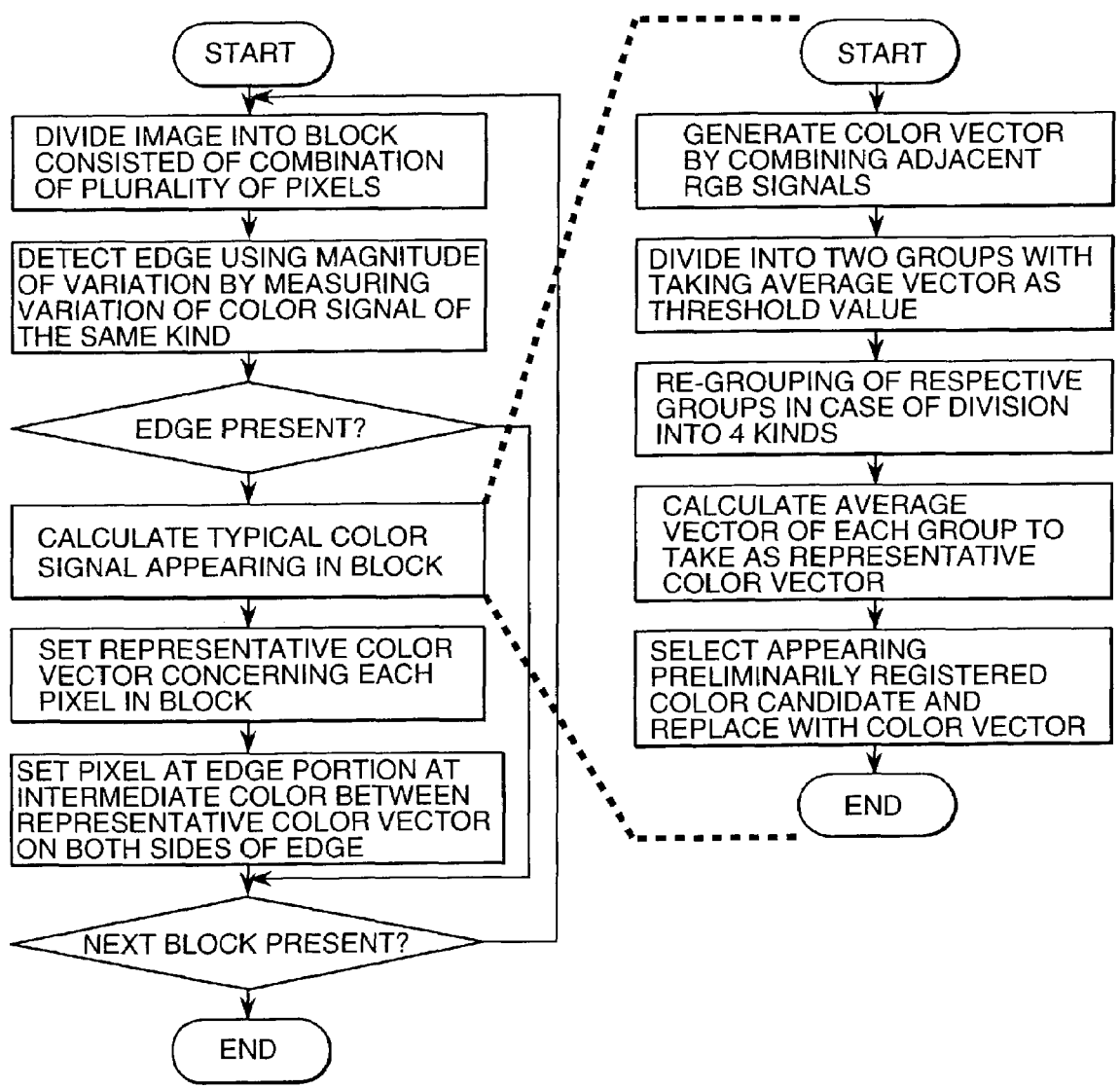
FIG. 13 is an illustration showing a flowchart of a color signal processing procedure of the edge portion of the present invention.

On the other hand, a process procedure shown in FIG. 13 may be used. Here, discussion will be given for the process procedure of the input image signal using the sensor employing the RGB filter. However, it does not depend on kind of the color filter.

Figure 14:
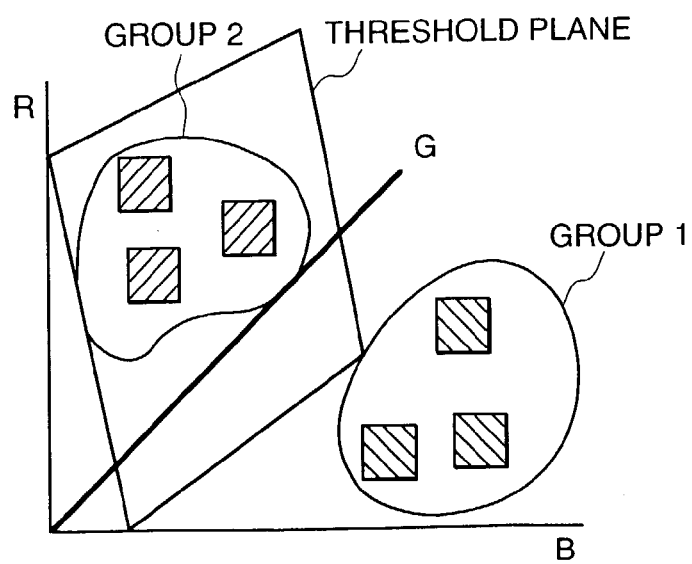
FIG. 14 is an illustration for explaining a principle of block compression method of the color signal of the present invention.

Start:

(Step 1) The image is divided into blocks consisted of combination of a plurality of pixels to perform signal processing per block. As shown in FIG. 14, the block is set as a region including a plurality of R, G, B.

(Step 2) Within the block, variation of the adjacent color signals of the same kind is measured for detecting presence or absence of the edge using magnitude of variation.

(Step 3) If edge is not present in the block, the process is advanced to step 7. If the edge is present, the process is advanced to the next step 4.

(Step 4) A typical color signal appearing in the block is calculated. Therefore, the statistical value of the color signal is measured and divided into groups. The color signal located at the edge portion may be eliminated from the foregoing calculation. The typical colors may be set to be two kinds, four kinds and so forth.

(Step 5) Concerning each pixel in the block, the representative color vector having minimum error is selected and set as the color vector of the pixel. Concerning the pixel of the edge portion, by replacing with one of the representative color vector, the color signal having no color drift can be generated.

(Step 6) As required, concerning the pixel positioned on the edge portion, smoothing process of the edge portion can be performed by replacing with the intermediate color derived from the representative vectors position on both sides of the edge portions. By this, visual smoothness can be realized in the edge portion.

(Step 7) If next block is present, the process is repeated from step (b).

End:

As set forth above, while the input image signal is consisted of one kind of color signal for one pixel, by the foregoing process, the color signal consisted of the combination of RGB can be set. Division into the group in set 4 is for setting the representative color in the block using values of the color signal and adjacent relationship of the pixels. On example of this procedure will be discussed for the case of RGB signal.

Figure 12:
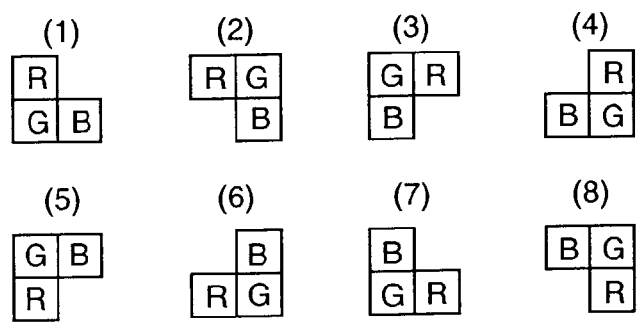
FIG. 12 is an illustration showing an example combined structure of the color signal of the present invention.

Start:

(Step 1) The color vector is generated based on the combination of the adjacent RGB signals. Here, with the combination of the pixels as shown in FIG. 12, with using the adjacent RGB signals for a plurality of times with shifting per pixel, the color vectors are generated. Depending upon magnitudes of variation in length and direction of the color vector, the edge position can be detected in the unit of pixel. For example, when the combinations (1) and (2) of the pixels shown in FIG. 12 is applied to the upper left end of the block, only pixel positions of the G signals are different. However, when the color vectors are different between them, variation in G signal thereof can be detected. Such edge detection may be used even by replacing with edge detection per color signal.

(Step 2) An average vector is calculated for all color vectors in the block to take as a threshold value to divide the color vectors into two groups. Rewording this as signal processing on the RGB color space, it means grouping the color vectors distributed on the RGB space shown in FIG. 14 on the threshold plane established by an average value of the RGB signal.

When four kinds of representative colors are to be derived, for respective groups, re-grouping is performed through the similar procedure.

(Step 3) An average vector of each group is derived to take as the representative color vector. Here, by eliminating the color vectors located at the end portions (upper extreme or lower extreme) in the group, noise can be eliminated. On the other hand, among preliminarily registered appearing color candidates, the candidate having the minimum error is selected to replace the color vector therewith.

(Step 4) The foregoing steps are performed for the next block.

End:

Next, one example of operation of the color signal conversion circuit 13 including the edge detection circuit 30 according to the present invention will be discussed with reference to FIGS. 15(A) and 15(B). FIG. 15 shows detection of the pixel located on the edge portion in the color signals stored in the memory 12 using the edge detection circuit 30. On the other hand, FIG. 15(B) shows a construction of the case where the code data by the difference encoding system is stored in the memory 12, in which the code data by the difference encoding is converted into the difference signal using a partial decoding circuit 31. Here, meaning of the partial decoding is that if the decoding process is performed completely, the image signal can be reproduced, whereas, in the construction of the shown apparatus, only difference signal between the adjacent pixels is reproduced. Then, by using the difference signal as the edge signal, the pixel position on the edge portion can be detected.

Figure 15A:
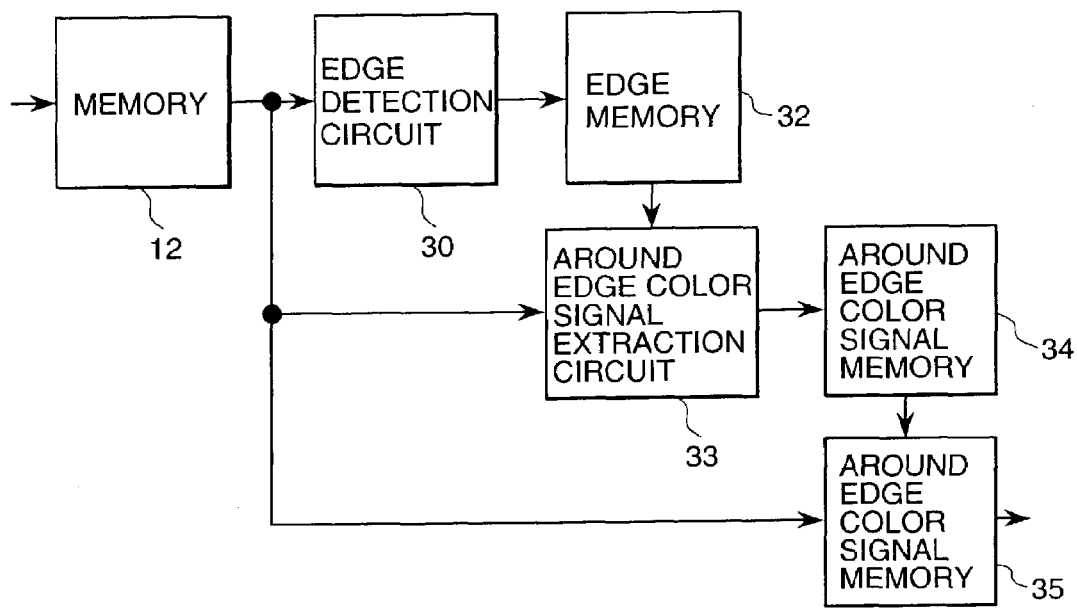
FIG. 15 is an illustration showing one example of the color signal processing procedure of the edge portion of the present invention.
Figure 15B:
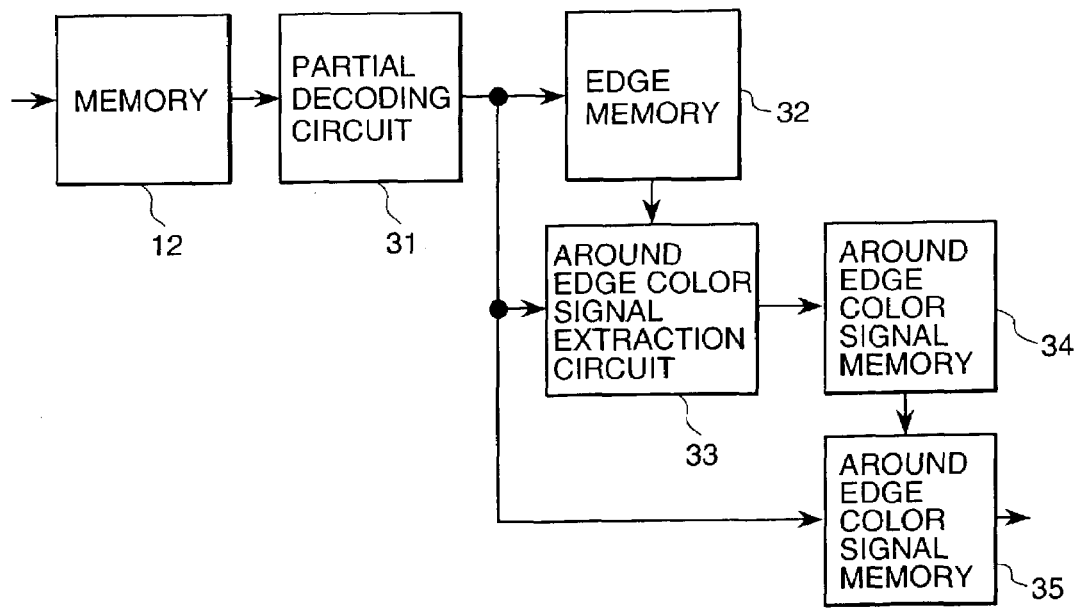

The pixel positioned on the edge portion derived with reference to FIGS. 15(A) and 15(B) is stored in an edge memory 32. Since the edge portion contained in the image signal can be detected as set forth above, the edge detection is performed using the edge peripheral color signal extraction circuit 33 based on the procedure discussed above to temporarily store the result in an edge peripheral color signal memory 34. Using such color signal, setting of the color signal is performed by a color signal setting circuit 35.

Figure 16A:
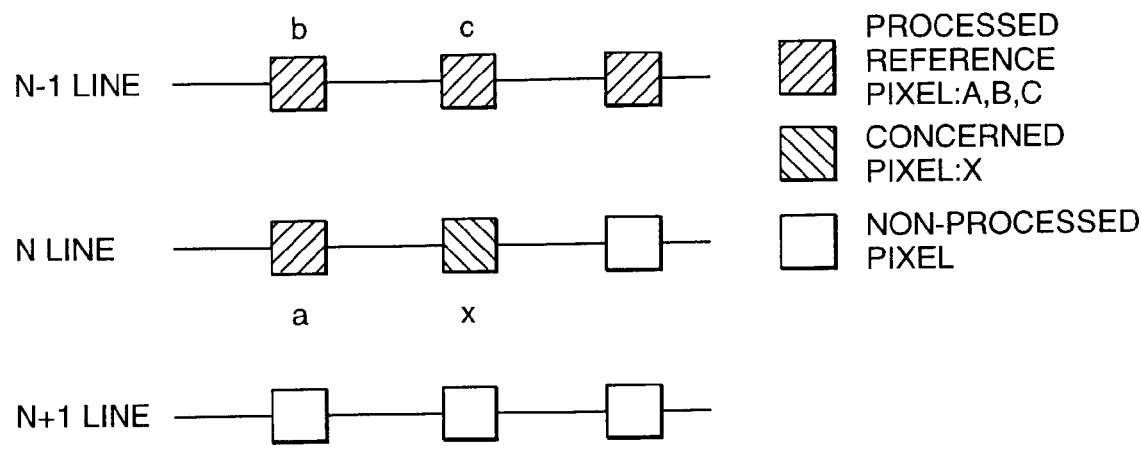
FIG. 16 is an illustration for explaining a principle of a difference vector on a color space of the present invention.
Figure 16B:
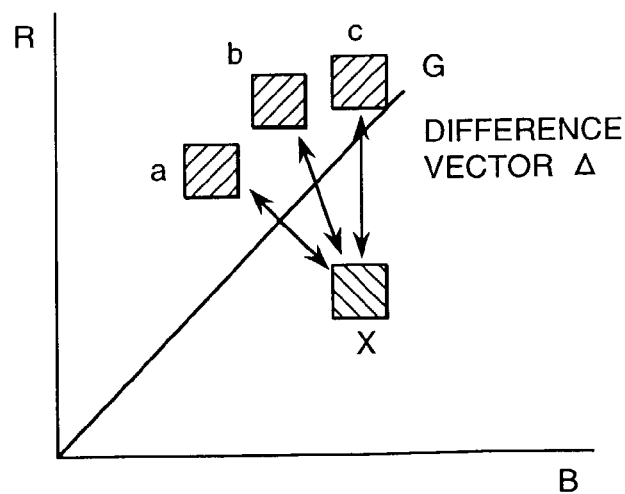

Meaning of the edge in the color image is illustrated in FIGS. 16(A) and 16(B). In order to detect the edge for the color image formed by a plurality of color signals, it is possible to perform edge detection independently for each color signal. However, it is also possible to perform edge detection by detecting as signal variation on a color space expressed by combinations of the color signals. For performing edge detection on the color space, signal variation of the pixels on the color space is measured and edge is detected by comparing magnitude of the signal variation with the threshold value. In contrast to this, when the signal variation is detected independently of each color signal, it is possibly cause fluctuation in detection whether the edge is present or not and in the detection result of the position. However, the present invention may solve such problem.

It should be noted that the edge portion set forth above may be detected using the difference value. Accordingly, edge detection and difference value calculation are used in the similar meaning.

The partial decoding circuit 31 of FIG. 15(B) does not decode the code data into the final color signal but output the difference value which can be derived at the intermediate stage in the decoding procedure. When difference encoding is used, it can be realized by a simple circuit. Thus, the edge detection circuit 30 and the partial decoding circuit 31 may output the edge detection result as the same meaning. This edge detection procedure is performed with respect to the entire area of the objective image. The result of detection may be stored in the edge memory 32. With making reference to the content of the edge memory 32, the color signal is again read out from the memory 12 to perform color signal conversion by the color signal converting circuit.

At first, discussion will be given for the edge detection operation. In the image where the character pattern is written on the white blank, for example, the edge represents the position of the pixels varying from white to black. In case of the white and black image, by the difference of the signal level of the adjacent pixels, judgment can be made that the edge region is present in a portion where the signal variation is large.

In contrast to this, if the one kind on the input RGB in color image, the signal of the adjacent pixels has the color signal of the kind different from that of the adjacent pixel. One method may use the block consisted of the RGB signal is shown in FIG. 14 in another method. When the RGB signal in the block are combined, it can be expressed by the coordination point of the color space having coordinate axes. The block configuration is set on the basis of the arrangement type of the combined RGB color signal. In the region where the color signal is uniform, when the block configuration including the concerned pixel is varied to change combination of the pixels, the combined RGB color signal is not varied. On the other hand, when the block configuration including the concerned image is varied, if the result of edge detection is different, judgment is made that the edge is present at the position of the concerned image. Then, by performing edge detecting operation with shifting the concerned pixel, edge detection can be performed for the entire image.

Next, one example of the manner of production of the difference signal for edge detection in FIG. 16(A). When each pixel has the RGB signal, by using the color signals of the concerned pixel x and the adjacent pixels a, b and c on the plane, a difference vector $\Delta j(R, G, B)$ between different block configuration can be calculated.

A difference value $\Delta j$ can be expressed by the vector on the RGB color space as shown in FIG. 16(B). The difference vector $\Delta j(R, G, B)$ corresponding to the adjacent pixel j can be derived from respective component of the color signal as expressed by the following formulae.

$$\Delta j(R,G,B)=((Rx-Rj),(Gx-Gj),(BX-Bj))$$

It should be noted the difference vector $\Delta j$ between the adjacent pixels can be similarly derived. The foregoing discussion has been given for the vector having the color signal as component, it can be expressed by a length connecting between coordinate points on the color space. Numerical value relating to the length may be expressed by square of the length of the vector, or in the alternative, may be expressed as a difference of the signals having the greatest value in the components of the vector. These may be expressed by the formulae:

$$\ddot{A}j(R,G,B)=SQRT((Rx-Rj)\hat{}2+(Gx-Gj)\hat{}2+(Bx-Bj)\hat{}2)$$

$$\ddot{A}j(R,G,B)=MAX((Rx-Rj),(Gx-Gj),(Bx-Bj))$$

In the alternative, it is also possible to express by taking out the luminance component from the color signal. For example, $$\ddot{A}j)=(Rx-Rj),(Gx-Gj),(Bx-Bj)$$

$\ddot{A}j$=signal $L^*$(luminance signal of uniform color space defined by Commission International de l'Eclairage CIE)+ wherein an operator "^" represents square, "SQRT" represents route and "MAX" represents maximum value extraction.

By comparing thus derived difference vector $\ddot{A}$ with the threshold value, judgment can be made whether the concerned pixel is located on the edge or not.

On the other hand, when the spectrum distribution of a plurality of color filters to be used by the sensor is not completely separated, the read color signal may have mutually overlapping portion on the spectrum. In such case, it becomes possible to realize improvement of resolution by performing color signal correction discussed below. For example, even when a red object is read using the RGB filter, not only the R signal but also G and B signals are varied. On the other hand, when the white object is read, values of all color signals may vary. The signal amplitude depends on the read object, sensing characteristics of the color filter and the sensor per se. Here, by preliminarily specifying the color of the object to read, utilizing sensitivity of the foregoing color signal, respective color signal can be corrected.

Figure 17:
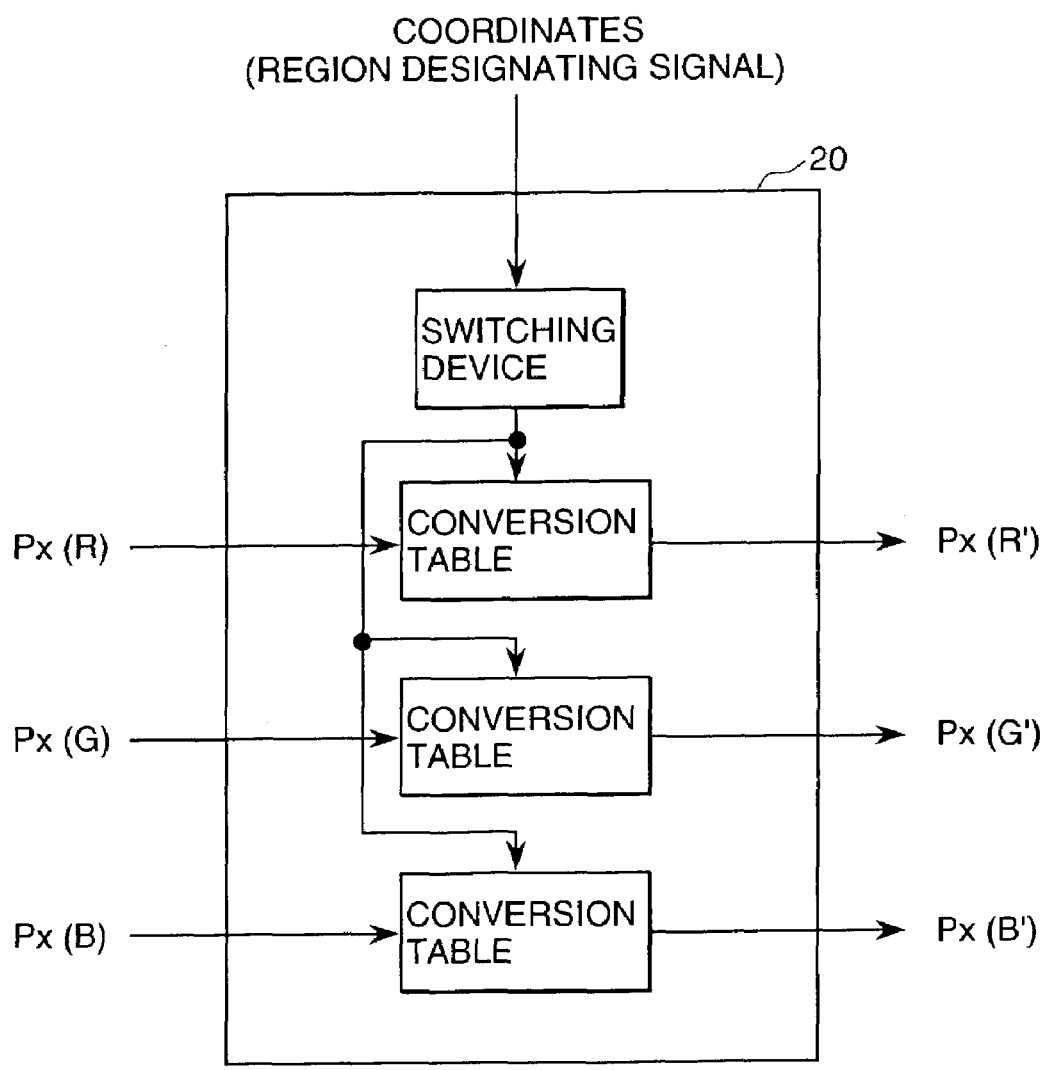
FIG. 17 is an illustration showing one embodiment of a color signal sensitivity correction circuit according to the present invention.

Next, FIG. 17 shows an example of a circuit construction for performing correction of the color signal using the conversion table. This circuit is arranged immediately after the AD converter 11, for example to perform correction of the color signal. The principle of signal conversion is to normalize the input signal with the amplitude value of the conversion signal. There is shown the case where the input RGB signal is converted into the white and black signal. Assuming that the minimum value and the maximum value of the coordinate points of the white and black signal on the RGB color space are (R0, G0, B0) and (R1, G1, B1), concerning the input signal P(R), P(G), P(B) relating to RGB, conversion result can be calculated by the following equation.

$$P(R')=(P(R)-R0)/(R1-R0)\times255$$

$$P(G')=(P(G)-G0)/(G1-G0)\times255$$

$$P(B')=(P(B)-B0)/(B1-B0)\times255$$

The principle of the signal conversion of the foregoing formulae is to normalize the input signal with the amplitude value of the conversion signal.

However, the color signal frequently has non-linear characteristics, such as a characteristics. On the other hand, in order to realize speeding up of arithmetic process, the arithmetic process can be performed using the conversion table.

By switching or re-writing the content of the conversion table on the basis of the result of measurement, correction process can be performed at high speed. For this measurement, the edge peripheral color signal extraction circuit 33 and the edge peripheral color signal memory 34 of FIG. 15(B) are combined to form a circuit. Then, for example, upon reading the white and black character, all pixels in the single-plate type color sensor can be used for white and black reading. A coefficient for this conversion may be user over the screen. However, it is also possible to provide independent coefficients for respective pixels. Then, measure can be taken simultaneously for the fluctuation of sensitivity of respective pixels of the sensors and amplitude correction of the color signal.

Using similar procedure, the color signal performs signal processing with taking sub-sampled image data as object. This is applicable for increasing definition of the image data, in which (Y, Cr, Cb) signal under JPEG compression system has different sampling rate, for example. Here, Y represents a luminance signal indicating brightness and Cr and Cb represent color difference signals.

For example, when Y signal and Cr and Cb signals are sampled at a ratio of 4:1:1, a high definition image of sampling rate at 4:4:4 using the foregoing procedure can be generated.

(2) Edge Enhancement

Figure 18:
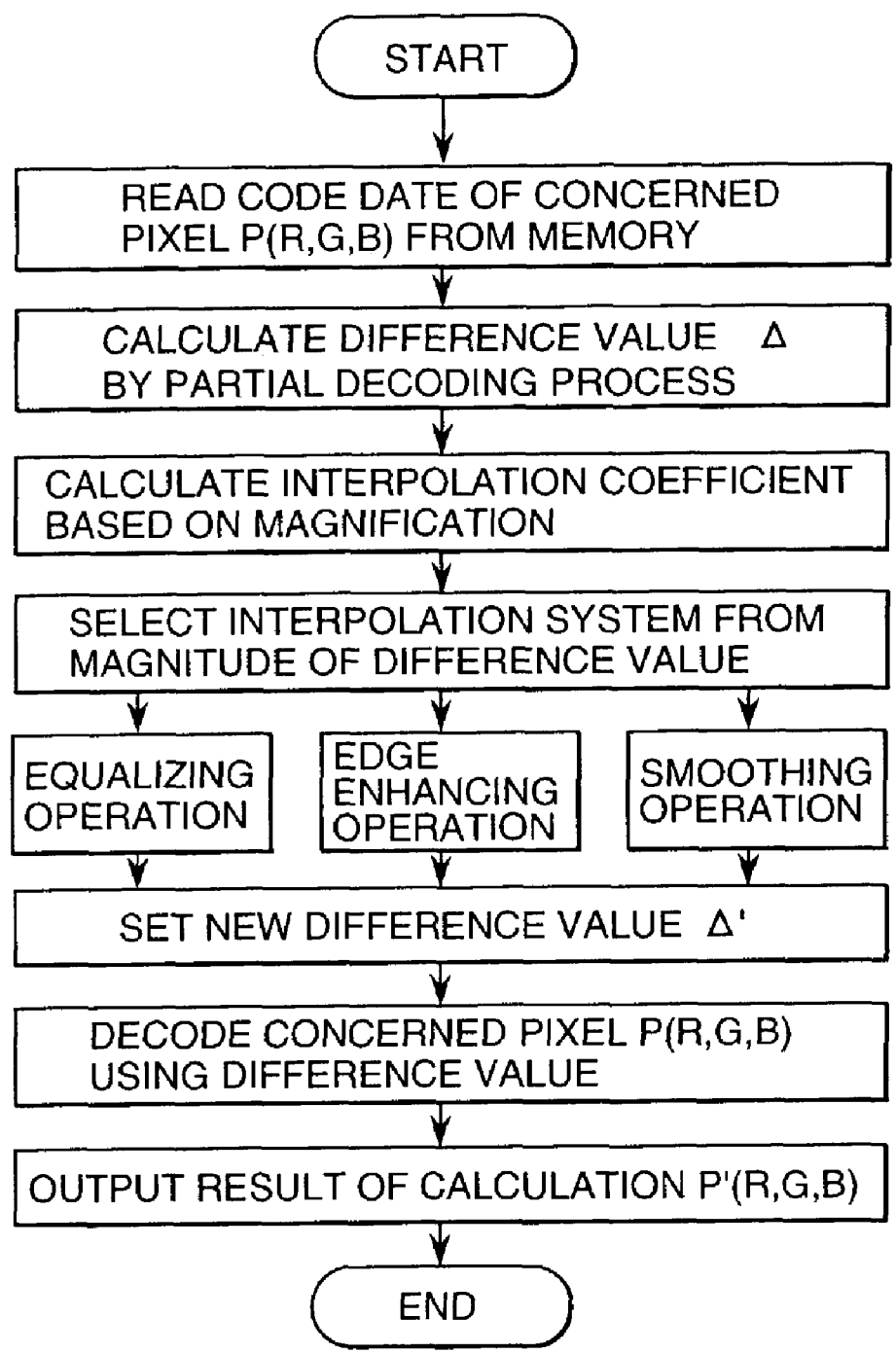
FIG. 18 is an illustration showing a flowchart of an image signal processing according to the present invention.

Signal processing talking the image signal as object includes resolution conversion, edge enhancement, smoothing and so forth. These signal processing can be done by batch process using the difference signal in consideration of signal processing of the color signals of adjacent pixels on the color space. In FIG. 18, there is shown an embodiment selecting the signal processing, such as equalizing, edge enhancing, smoothing and so forth on the basis of the result of edge detection taking the signal characteristics of the edge portion.

Then, on the basis of magnitude of the difference, the content of the following signal processing is selected.

In case of Difference $\Delta \geqq$ Threshold value 1
: Select Equalizing Circuit
In case of Difference $\Delta \geqq$ Threshold value 2
: Select Edge Enhancing Circuit
In case of Difference $\Delta >$ Threshold value 3
: Select Smoothing Circuit The feature of the foregoing edge detection is to make judgment of the difference $\Delta$ by combination of the RGB signal of the pixel. If judgment of the RGB signal is made separately, offset may be caused in the judgment position per color signal. In contrast to this, in the present invention, result of edge detection can be obtained without offset.

As set forth above, using the detected difference value $\ddot{A}$ or judgment result, such as the edge position or the like, united signal processing can be realized for most of signal processing which are performed separately performed in the prior art for difference of objects.

Figure 19:
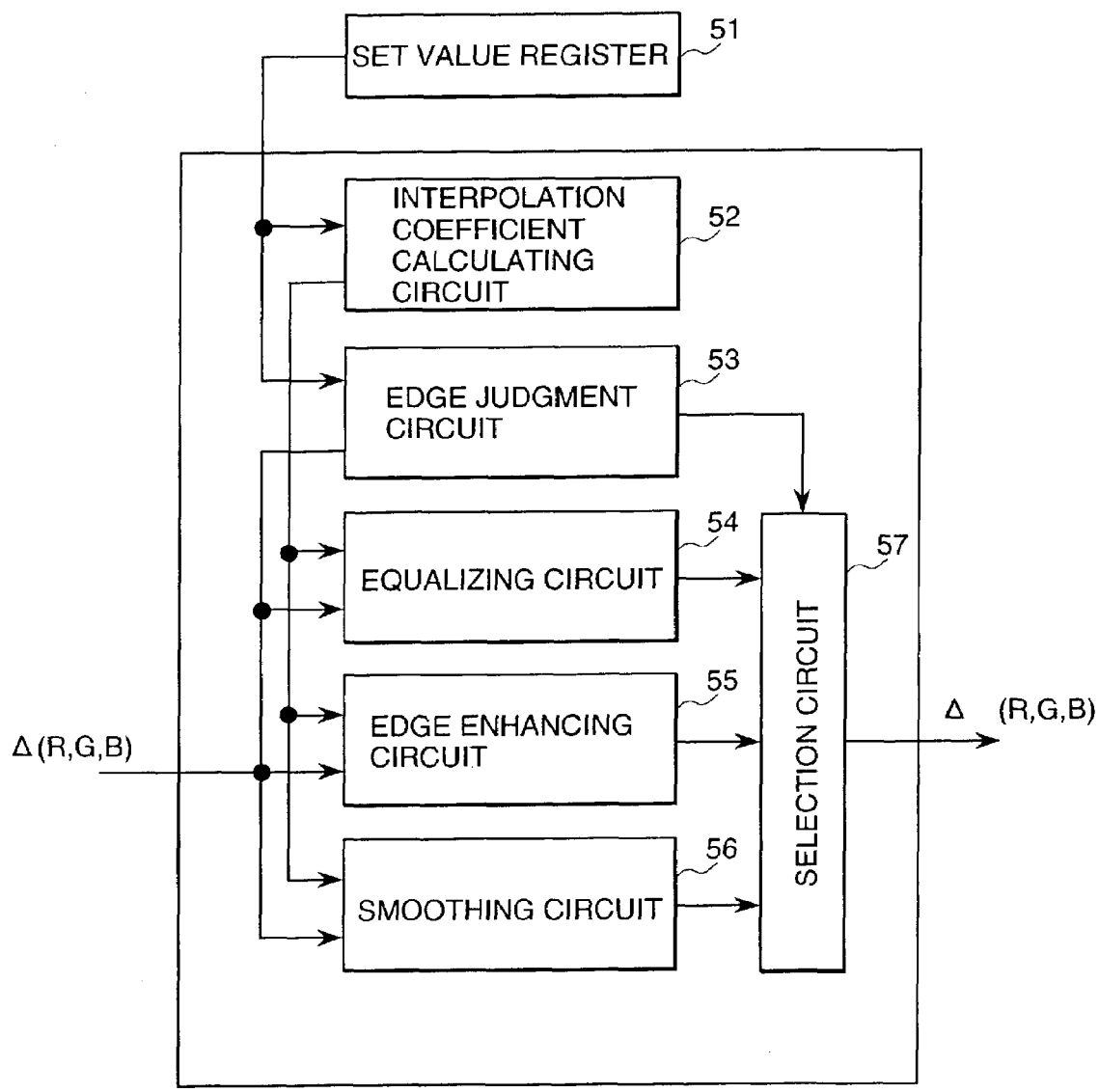
FIG. 19 is an illustration showing one embodiment of a color signal correction circuit according to the present invention.

One embodiment, in which the foregoing procedure is applied to the circuit construction shown in FIG. 19, will be discussed hereinafter.

The circuit is constructed with a set value register 51 for setting the threshold value, the enlarging and contracting ratio and so forth, an interpolation coefficient calculating circuit 52 based on the enlarging and contracting ratio, an edge judgment circuit 53, an equalizing circuit 54, an edge enhancing circuit 55, a smoothing circuit 56 and a selection circuit 57 selecting the result of process. The edge judgment circuit 53 performs judgment formula with making reference to the content of the set value register 51 and selectively output the result of operation of the equalizing circuit 54, the edge enhancing circuit 55 and the smoothing circuit 56 using the selection circuit 57. By inputting the difference value of the RGB signal, the difference value resulting from the signal processing is output. Particular signal processing content will be discussed hereinafter.

The edge enhancement process is a method widely used conventionally for the purpose of providing better visual appearance by amplifying tone variation at the edge detecting position.

Processing procedure and circuit construction for enhancing the edge using one kind of color signal per pixel will be discussed.

Figure 20A:
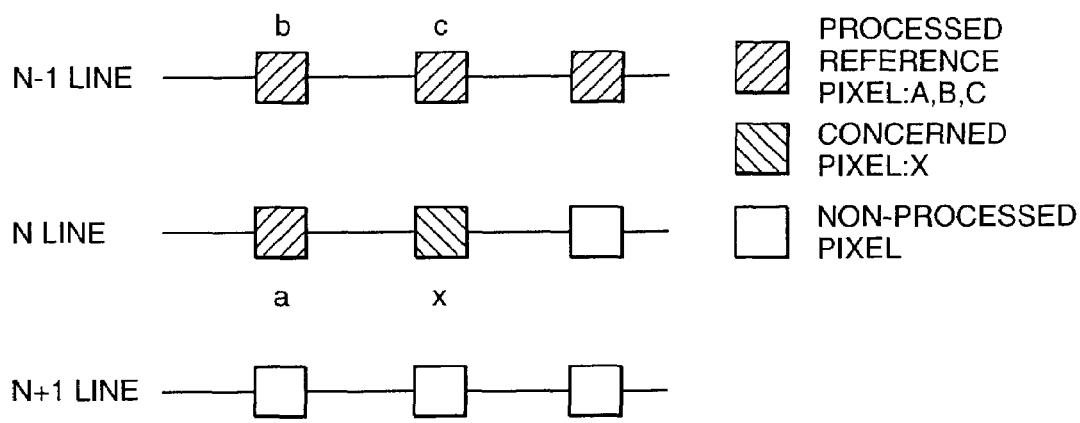
FIG. 20 is an illustration for explaining a principle of an edge enhancement using the difference vector in accordance with the present invention.
Figure 20B:
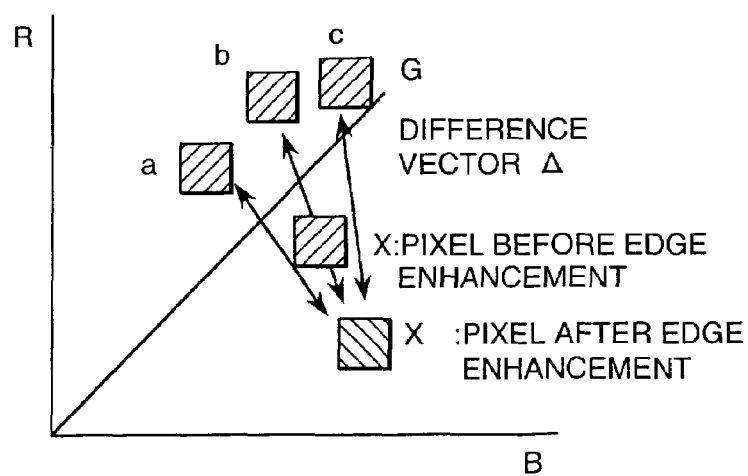

The edge contained in the image can be detected as vector on the color space as shown in FIGS. 20(A) and 20(B). The result of edge detection becomes a signal indicative of transition portion of the regions of difference colors. Expressing the color in each region on the RGB space, the edge portion can be expressed by the coordinate points on the vector connecting respective regions. Here, by adjusting the length of the vector, process result corresponding to a differentiation filter or integration filter can be obtained. Shifting of the position of the concerned pixel x in the drawing based on the above corresponds to varying of the length of the difference vector. Particular signal processing is to multiply the difference value of respective color signals by a coefficient corresponding to variation of the vector length. In this system, advantage is achieved in not causing color drift between the RGB signals.

(3) Enlarging and Contracting Process

Figure 21A:
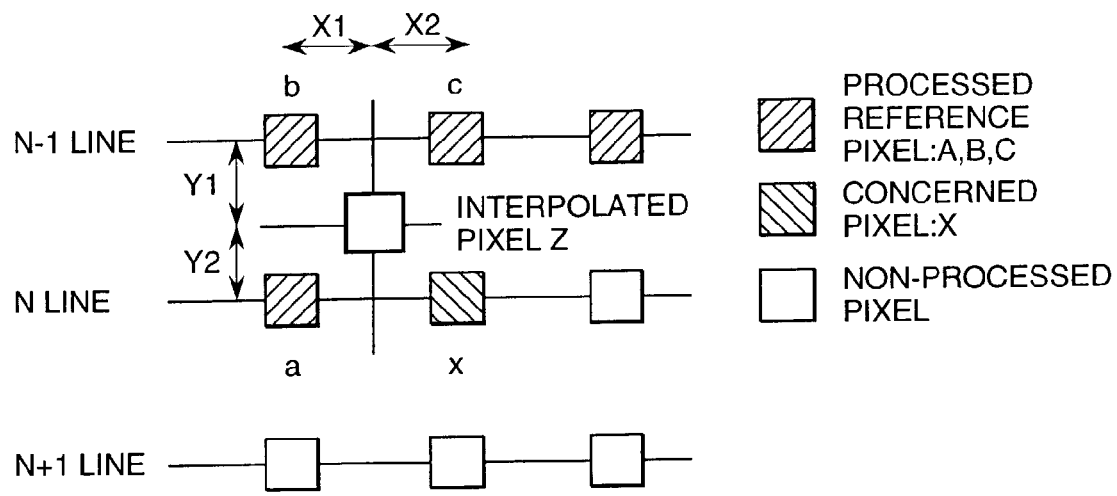
FIG. 21 is an illustration for explaining one example of an enlarging process of the present invention.
Figure 21B:
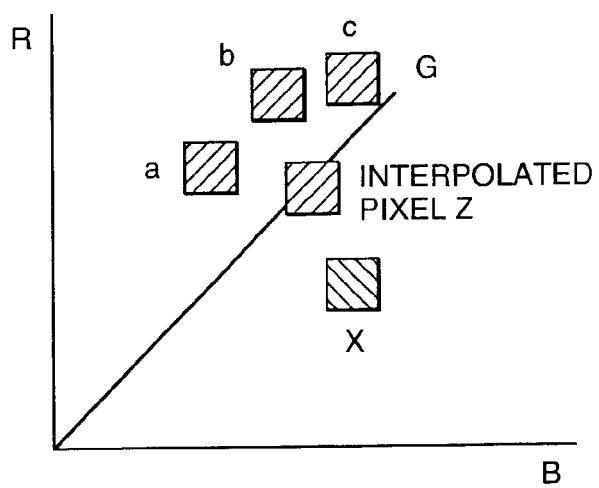

Enlarging and contracting is to calculate the signal of the pixel position set adapting to magnification from the pixel signal of the original image. Here, increasing of number pixels, namely enlarging process for printing adapting to resolution of the printer will be discussed taking the construction for printing the image data picked-up by the digital camera by the printer as example. The principle of the enlarging process is to calculate the position of new interpolation pixel Z and the color signal value determined from the magnification as shown in FIGS. 21(A) and 21(B). The magnification may be set at the same value in the horizontal direction and the vertical direction or set to arbitrarily vary. Calculation of the color signal value of new pixel can be done by interpolation process from the difference value of the signals of adjacent pixels. Expressing the interpolation process on the RGB color space, it corresponds to calculating the new coordinate point by dividing the vector connecting the coordinate points on the color space on the basis of the magnification. The coordinate points of the new interpolation point Z can be derived by respectively independent quota share calculation with respect to the RGB signals.

Such interpolation process can be performed using the color signals of the adjacent pixels, the set enlarging and contracting ratio, position information (X1. X2, Y1, Y2 in FIG. 21(A)) of the newly set pixel.

In the present invention, utilizing the color signal of the image data to perform enlarging process, detection of the edge position is performed in advance of performing the foregoing interpolation process to switch the method or means of performing interpolation process. In the present invention, by utilizing the arrangement information of the color signals, the edge position can be detected in the precision of the unit of pixel. For example, performing enlarging process for the contour of the character pattern and a photograph image by the same interpolation method, may not always obtain the preferred image quality. In contrast to this, according to the present invention, switching of the interpolation process can be performed at high precision to improve image quality of the result of interpolation.

If the pixel newly generated on the basis of the enlarging ratio is not located at the edge portion, the color signal of the interpolation pixel is derived by quote share operation from the color signal of the adjacent pixel. On the other hand, if positioned on the edge portion, the color signal of the pixel is set from the color signal of the color region around the edge portion where the pixel belongs using the procedure shown in foregoing FIGS. 12 and 13.

By the present invention, utilizing color arrangement information and number of pixels of the input device and the output device, enlarging and contracting (increasing and decreasing of number of pixels) can be performed with maintaining gradient of the edge portion of the image data. Also, enlarging and contracting (increasing and decreasing of number of pixels) can be performed with maintaining contour shape of the edge portion.

Next, discussion will be given hereinafter with respect to color signal conversion for improvement of color reproductivity. A basic construction of the digital camera is constructed from a plurality of kinds of color filters and the optoelectric conversion elements. Therefore, if pick-up object and wavelength characteristics of illuminating light can be input, information for performing faithful color reproduction can be performed. On the other hand, upon inputting the color image, the color filter having three kinds or more spectrum distribution can be used. For example, in order to realize high color reproduction characteristics using six kinds of color filters, six kinds of color filters are regularly arranged in the optoelectric conversion elements of the single-plate type sensor, to make internal between the pixels of the same color kind large. For example, for combining six kinds of color signals, outputs of six pixels arranged in plane are combined to cause degradation of resolution. By using the present invention, high resolution and color reproductivity can be realized.

Figure 22A:
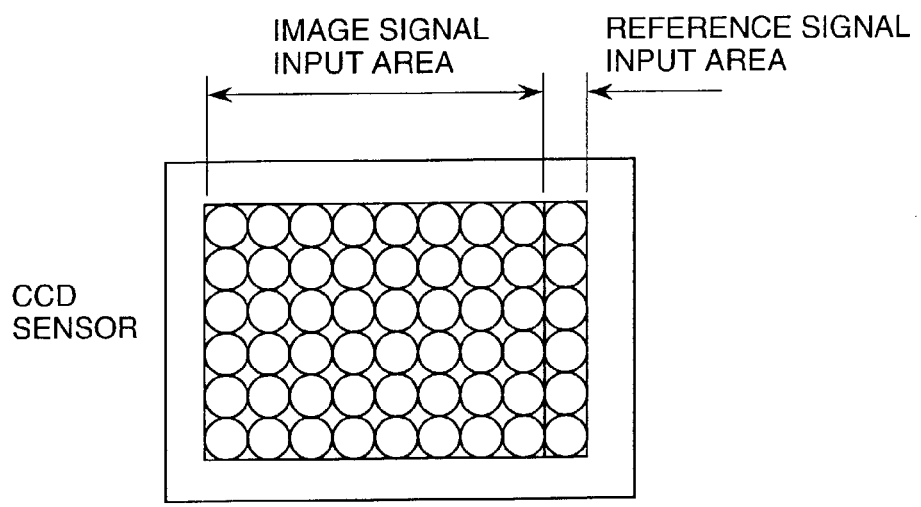
FIG. 22 is an illustration showing one constructional example of a correction circuit using a reference signal of the color signal of the present invention.
Figure 22B:
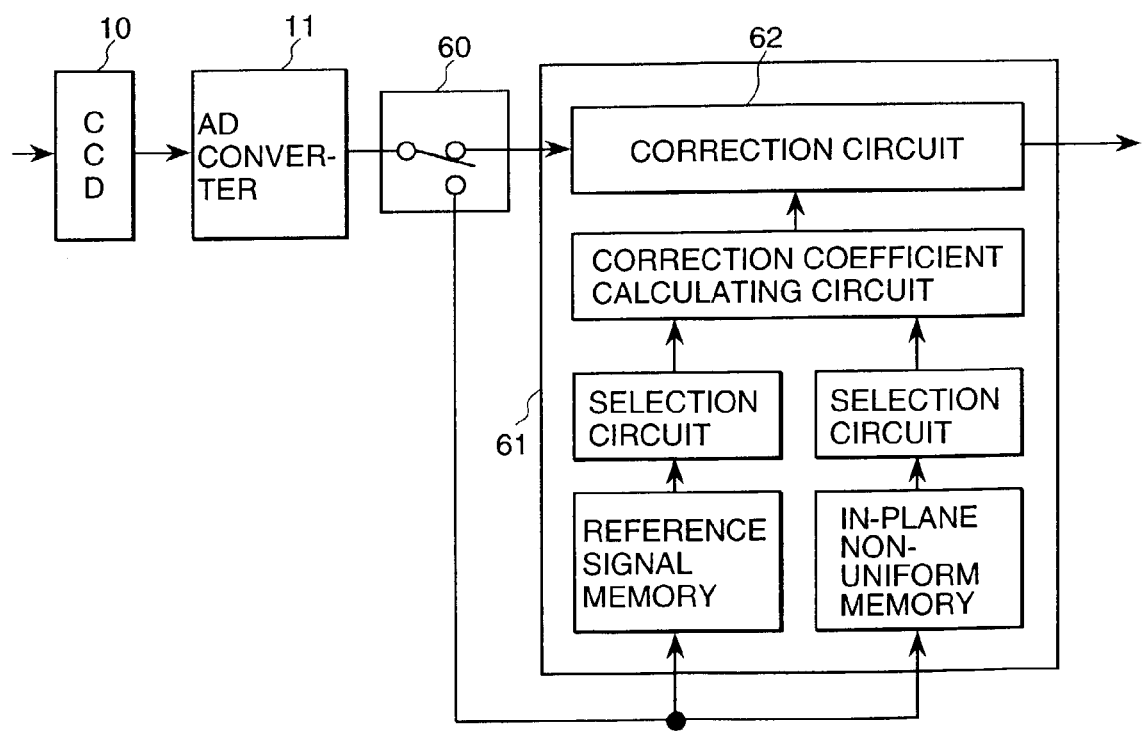

Therefore, as shown in FIGS. 22(A) and 22(B), by preliminarily measuring characteristics of the color filter and the optoelectric conversion elements unique to the digital camera and providing means for storing the measurement result in the internal memory, the characteristic value corresponding to the spectrum distribution of the digital camera can be prepared.

The read pixel of the color sensor shown in FIG. 22(A) separately sets the image signal input area and the reference signal input area. In the reference signal input area, by arranging a plurality of color filters for measuring spectrum distribution of the input light, operation as one kind of spectrophotometer can be realized. Furthermore, at a timing of measurement using the digital camera, it is possible to provide the sensor for measuring fluctuation of characteristics, such as internal temperature and so forth.

One example of construction of the means for measuring characteristics fluctuation will be discussed using FIG. 22(B).

At first, the means for measuring characteristics fluctuation includes the CCD sensor 10 as basic element of the digital camera, the AD converter 11 for converting the color signal from the CCD sensor 10, a switch 60 for switching the signal upon measurement of characteristics fluctuation and upon actual image pick-up, a memory for storing the result of measurement, and a correction circuit 62 for performing correction process in the memory 61 on the basis of the measurement result stored in the memory 61.

On the other hand, in order to provide stable measurement environment upon measurement, a reference color plate is set on a light path. Since the reference color plate is unnecessary upon picking-up the image, the reference color plate can also be used as a shutter located outside of a lens or an iris. For example, by painting the back surface of the shutter located outside of the lens in white and illuminating the back surface of the shutter using an internally provided illuminating means, a reflected light can be read by the sensor. In the alternative, by firmly fitting the separately prepared reference color plate on outside of the lens and illuminating the same by the internal illuminating means in the condition where the shutter is opened, the reflected light can be read by the sensor.

The result of measurement by the foregoing means is combined with the characteristic value unique to the equipment, a correction coefficient for signal correction is derived for performing correction of the input image signal upon actually picking up the image.

Figure 23:
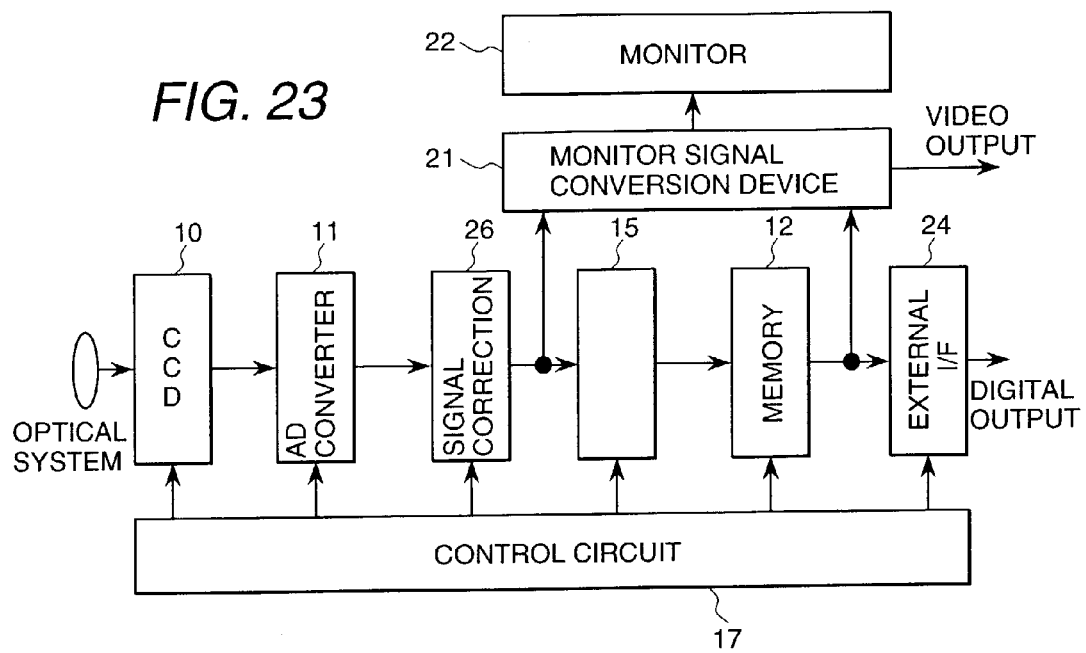
FIG. 23 is an illustration showing one embodiment of a construction employing a digital camera in an image signal processing apparatus according to the present invention.

One construction of the digital camera incorporating the signal correction circuit set forth above is illustrated in FIG. 23. A control circuit 17 controlling overall operation is constructed with a microprocessor operated by a program, for example. An external signal output can be a plurality of kinds, such as a digital output using an external IF 24 and a video signal using the monitor signal converting circuit 21. Concerning the constructions of respective elements are as already discussed, by operating with one kind of color signal per one pixel, high speed process and high color reproductivity can be realized. Here, in the drawing, in a signal correction circuit 26, the foregoing circuit can be incorporated. Data compression by the encoding circuit 15, difference encoding or the like can be used, for example for performing high speed operation with simple construction of the apparatus and for performing image processing using the difference signal.

Figure 24:
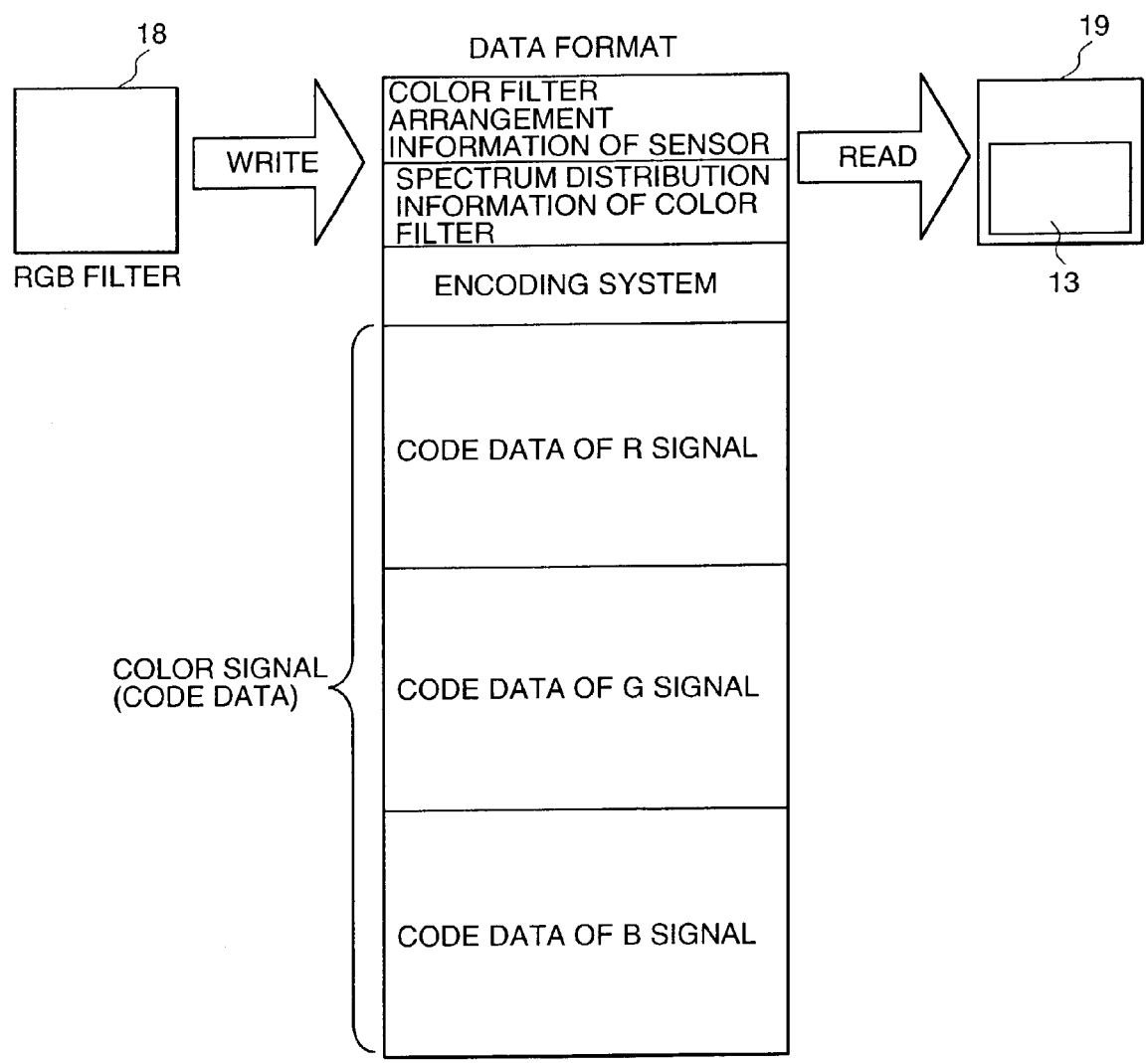
FIG. 24 is an illustration showing one structural example of a data format of the present invention.

Next, in the image processing system, FIG. 24 shows one embodiment of a data format of the digital output between the digital camera 18 as the input device and the printer 19 as the output device.

In the data format, at least an arrangement information of the color filter of the color sensor and spectrum distribution information of the color filter shown in FIG. 3 are added. The image signal is a one kind of color signal per one pixel depending upon the structure of the sensor. Then, by using the R signal, the G signal and B signal and the arrangement information of the color filter of the color sensor in the same data format, the position of the pixels respectively indicated by the R signal, the G signal and the B signal can be fixed. Thus, using the data format, the output of each pixel of the color sensor and equivalent color signal can be re-used.

Therefore, on the side of the output device receiving the data format, the signal processing for high color reproductivity adapting to the output device can be realized. For example, in case of the printer, it is inherent to convert from the received color signal into the color signal for ink printing. However, by using the spectrum information of a developer (ink, toner and so forth) to be used in the printer and spectrum information of the received color signal, high precision color signal conversion can be realized. On the other hand, from the arrangement information of the color filter, color signal conversion, such as resolution conversion and edge enhancement and so forth, can be realized. On the other hand, as discussed below, by combining the arrangement information of the color filter and the arrangement relationship of the color signal of the display device, display with high resolution and color reproductivity can be realized. On the other hand, in advance of transfer of the image data, notice of the equipment characteristics can be performed. Then, after checking the characteristics of the equipments between the equipments transmitting and receiving the image data, image data transmission is started. Such procedure can be realized by setting a protocol for exchanging information between the devices for transmitting data.

On the other hand, when the system to be connected or equipment construction are fixed, the arrangement information of the color filter set forth above or information of the arrangement of the color signal of the display device and so forth are set preliminarily to perform signal processing for resolution and color reproductivity without notice.

In the foregoing discussion, the color signal is assumed as RGB. However, it is of course possible to use other color signal, such as CMY or the like, and the kind s of the color signal can be set arbitrary. On the other hand, using a protocol for exchanging information, it is possible to transmit the arrangement information of the color filter and the image signal in different data formats without matching these into the same data format. On the other hand, when the performance of the signal processing of the output device is not sufficient in comparison with the input device, and the overall process speed can be improved by performing conversion of the pixel number or color conversion by the input device, the color arrangement information of the output device is transferred to the input device and to transfer the result of signal conversion based on the transferred information to the output device.

Next, discussion will be given for the display device of the color image.

In general, a flat-screen type display, such as a color LCD or the like is arranged pixels for emitting, transmitting or reflecting the color, such as RGB in two-dimensional manner and displays the color image by controlling the signal levels of respective pixels. Therefore, one pixel can display one kind of color signal. On the other hand, the single-plate color CCD sensor inputs one kind of color signal per one pixel.

As set forth above, when the input device and the display device of the color image, which can handle one kind of color signal per one pixel, are combined, by performing conversion of kind of color signal, number of pixels and arrangement of colors between the input device and the output device, merits which cannot be achieved in the prior art, can be realized. Also, when the image data is generated by the personal computer or the like, by generating only color signals of the pixels used for actual display depending upon the characteristics of equipment as the image display device, load, such as transmission, accumulation, signal processing and so forth can be reduced.

Figure 25:
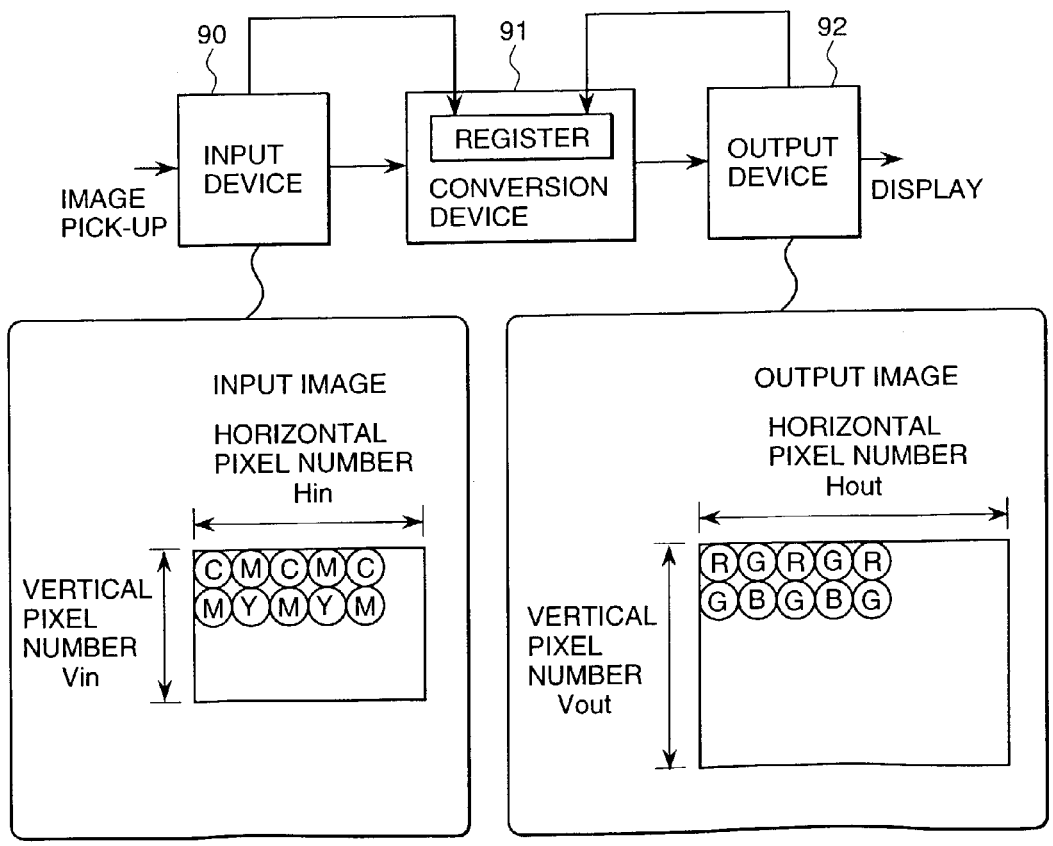
FIG. 25 is a structural illustration of a combination of the input device and the output device of a color image according to the present invention.

As shown in FIG. 25, the present invention will be illustrated in terms of the construction of the apparatus, in which both of the input device 90 and the output device 92 have color arrangement within the plane. The input device 90 receives input of the picked-up image data having a horizontal pixel number $H_{in}$ and a vertical pixel number $V_{in}$, and has the color arrangement using CYM color filter. In order to display the picked-up image data over the entire area of the display device with the device construction set forth above, conversion of pixel number and conversion of the color signal are inherent. Therefore, the conversion device 91 takes the color arrangement information of the input device 90 and the color arrangement information of the output device 92 to perform arithmetic operation for conversion of pixel number ($H_{in} \rightarrow H_{out}$, $V_{in} \rightarrow V_{out}$) and color conversion (CMY→RGB). Namely, conversion process of the pixel number and the color to be performed between both devices is required only once.

In contrast to this, using the standard signal, such as television signal, both devices are not required to consider characteristics of the counterpart device. However, means for performing conversion of the pixel number and the color signal are inherent in both of the input device and the output device. The present invention set forth above is advantageous in realizing simplification of the device construction utilizing characteristics of the counterpart devices.

On the other hand, as shown in FIG. 26, the color signal to be output to the display device is one color signal per one pixel output on the basis of arrangement of the color filter of the display device. Accordingly, the conversion process of the pixel number and color may be done for calculating and outputting the color signal required for display adapting to arrangement of the pixels of the output device. For example, while the display device is for RGB three color display as considered one entire screen, the (N)th line alternately displays the R signal and the G signal. Accordingly, adapting to the timing of the R signal and the G signal to output, conversion process of the R signal and the G signal may be performed. In similar manner, in the (N+1)th line, conversion process of the G signal and the B signal is performed for outputting alternately. In contrast to this, using the standard signal as the television signal, conversion process using three kinds of color signals per pixel has to be performed. As set forth above, in the present invention, since calculation is to be performed only for the color signals to be output, simplification of the apparatus construction can be realized.

Next, discussion will be given for one example of operation of the signal processing means as combination of conversion of kind of colors and enlarging/contracting for the input image using a circuit construction shown in FIG. 27 as a particular example of signal processing for implementing the signal conversion (pixel number, kind of color signal and so forth) using the characteristics of the equipments of both of the image input device and the image display device.

In advance of performing signal processing, by equipment characteristics registers and notifying means incorporated in the input device and the display device, a notice of the equipment characteristics (pixel number, kind of the color signal, spectral characteristics of the color filter and so forth) is received and stored in an information register in the signal conversion device. The entire signal processing is performed for objective pixels set by the address generating circuit 121 on the basis of the interpolation coefficient. Then, the input signal to be object for processing is checked whether it is positioned on the edge portion or not by the edge detection circuit 120.

Figure 27:
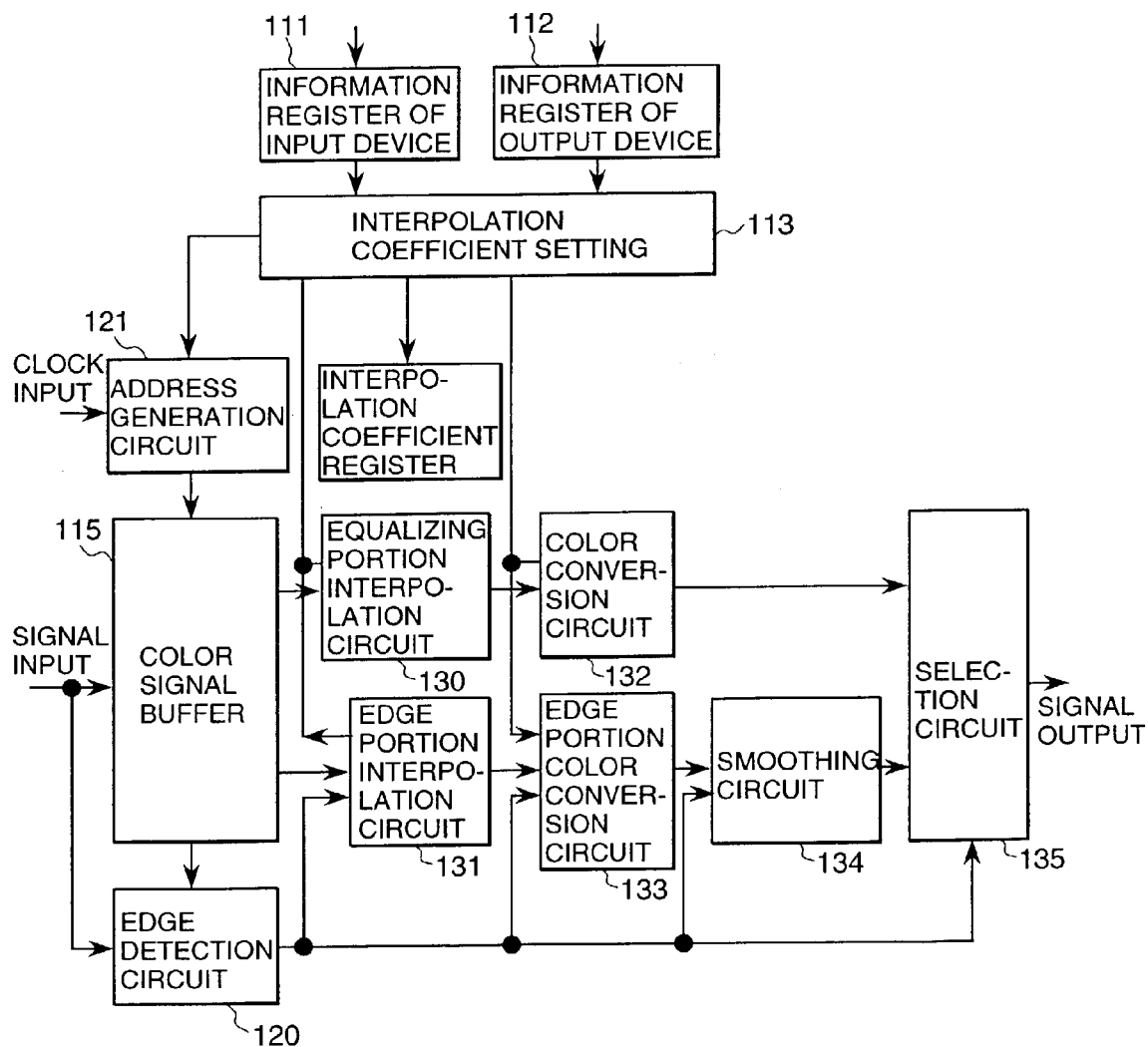
FIG. 27 is an illustration showing one embodiment of an enlargement and color conversion according to the invention.
Figure 28:
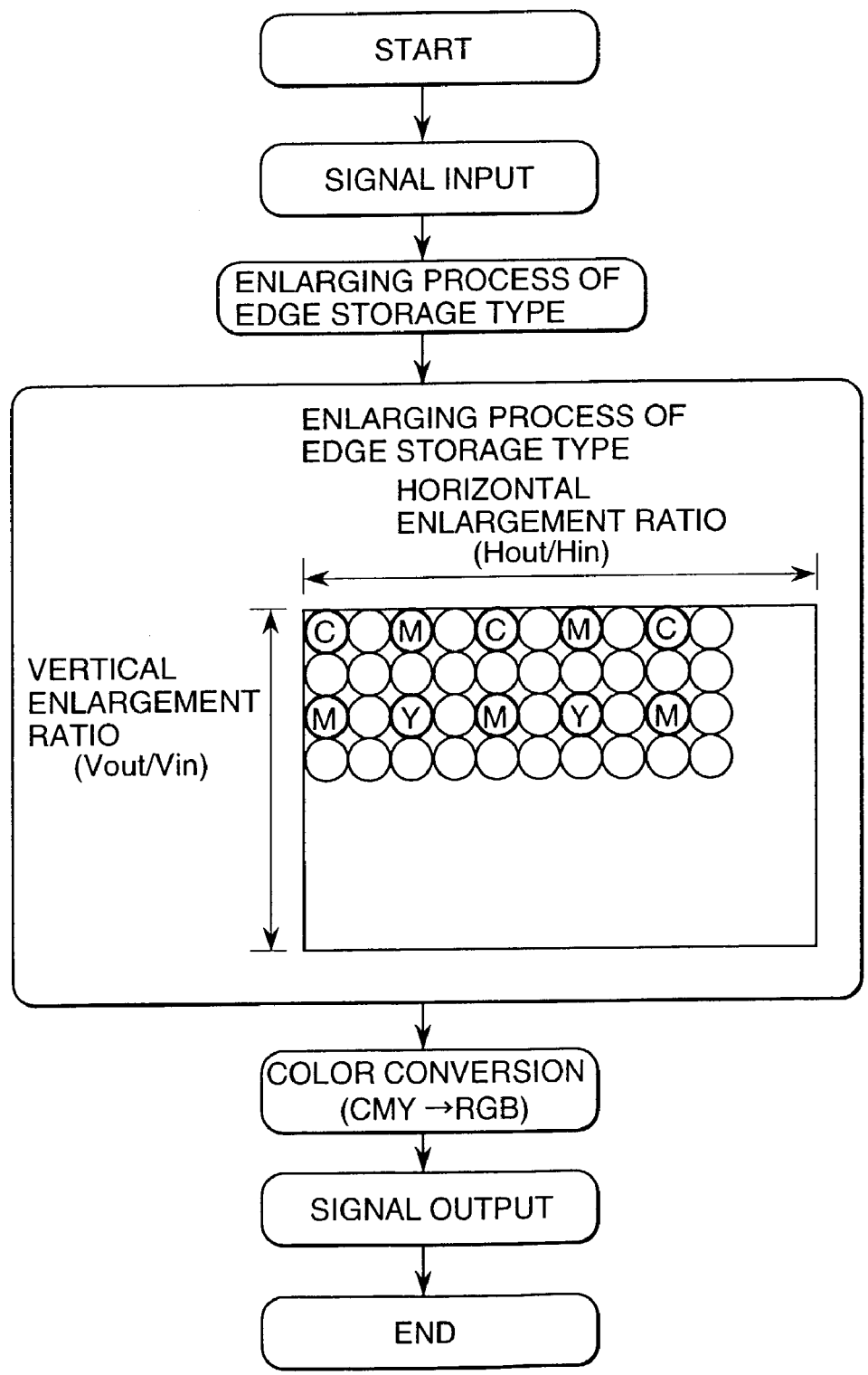
FIG. 28 is an illustration showing one example of the process procedure of FIG. 27.

Hereinafter, one embodiment of the signal processing procedure between the input device and the output device in accordance with the present invention will be discussed with reference to FIG. 27 and FIG. 28 showing the procedure thereof.

(Step 1) From the input device and the display device of the color signal, information relating to kind, pixel number, color arrangement of respective color signals is received and set and stored in the registers 111 and 112.

(Step 2) With reference to the content of the registers 111 and 112, calculation rules of the color conversion circuit and the interpolation coefficient setting circuit 113 for enlarging and contracting process are set.

(Step 3) From the input device (e.g. the camera using CCD or the like) or a color signal buffer 115 storing the input data the color signals of the pixels are input according to sequential order for processing to perform calculation process on the basis of the set calculation rule set forth above. An equalizing portion interpolation circuit 130 on the basis of the interpolation coefficient and an edge portion interpolation circuit 131 performs signal processing differentiated depending upon whether the input signal is positioned on the edge portion or not with respect to the edge portion detected by the edge detection circuit 120 to improve image quality. On the other hand, a color conversion circuit 132 and a edge portion color conversion circuit 133 may also perform different signal processing depending upon positional relationship of the input objective pixel relative to the edge portion. On the other hand, concerning the pixel positioned at the edge portion, smooth image signal is generated using a smoothing circuit 134. Whether the pixel is positioned on the edge portion or not is selected and output by a selection circuit 135. It should be appreciated, that a start timing and an end timing of the foregoing calculation process are different depending upon the construction of the apparatus, but can use designation of the operator, for example.

(Step 4) The color signal of the pixel obtained by the calculation process is output to the output device or a temporary storage memory.

(Step 5) The foregoing procedure is repeated according to the sequential order of processing. The end timing is different depending upon the construction of the apparatus. However, it is possible to use a calculation end timing of the entire pixels contained in one screen as the end timing.

End:

Thus, in the signal processing device, in which the input device and display device of the color image are combined, signal processing is performed using the arrangement information of the color filter of the input device and the arrangement relationship of the color signal of the display device to realize display of high resolution and high color reproductivity.

It should be noted that the smoothing process for improving resolution of the edge portion of the character pattern or the like realizes smooth display by generating the signal of the pixel not contained in the input signal, in the peripheral portion of the display pixel as shown in FIG. 29, for example. The interpolation signal for smoothing can be determined depending upon the signal level of the peripheral portion irrespective of kind of color. For example, even when the adjacent pixel is R signal, the interpolation pixel can be G signal. Observing in the unit of pixel, the interpolation pixel is the color signal not contained in the input signal and is effective for visually smooth display as tone reproduction characteristics in area as combined with illumination of the adjacent pixels. As construction of the apparatus, a conversion table on the basis of the signals of the peripheral pixels is prepared in the smoothing circuit 134 shown in FIG. 30 and the content of the conversion table is set on the basis of the characteristics if the display device, smoothing effect can be realized. The content of the conversion table may be set in advance of the display operation of the display device on the basis of the information of the pixel pitch of the display device (resolution), color arrangement, tone reproduction level and so forth.

The operation of the foregoing circuit may be used as characteristics improving system of the sole display device even when information, such as color arrangement and so forth of the input device is not known. On the other hand, even when the input signal has known format, such as display signal of the personal computer (display format of VGA, XGA and so forth) or the television signal (MPEG compression format of the digital television and so forth), the characteristics of these display signal can be used. For example, the MPEG compressed color image signal may be preliminarily judged the number of pixels forming the display screen, kind of the color signal, signal amplitude, contained frequency component and so forth.

For outputting such color image signal by the color display device, if the conversion of the color signal and the conversion of the resolution (pixel number) and so forth as set forth above becomes necessary, utilizing the present invention, the input signal and characteristics conversion of the output device can be efficiently realized, and display in high image quality can be achieved.

On the other hand, the foregoing procedure is applicable even for a projection type display device, in which the color CRT and a fine reflection mirror are combined. Furthermore, even in the printing device on the basis of various printing principle, it is applicable for arrangement position of the ink or toner and calculation of the dot size.

Data amount of the color signal corresponding to the image information can be reduced, and data format which can shorten the process period in simple construction or the image processing system using the same can be provided. On the other hand, the signal processing, image display or the image reproducing apparatus capable of recording of high quality color image can be provided.

INDUSTRIAL APPLICABILITY

As set forth above, the image signal processing method, apparatus and system according to the present invention relates to the image signal processing method, apparatus or the image signal processing system using the same adapted to high image quality and high speed process with simple construction.

The invention claimed is:

1. An image signal processing system comprising:
an input device including:
   filter means of a plurality of kinds of spectrum distributions in a plurality of optoelectrical conversion elements on a plane;
   a sensor for reading an object and outputting a plurality of color signals;
   an analog to digital (AD) converter for performing AD conversion of the plurality of color signals from said sensor;
   an encoding circuit for encoding a plurality of the AD converted color signals;
   a memory for storing the encoded color signals;
   a transmitting portion for transmitting a plurality of the stored color signals from said memory and a color arrangement information indicative of a relationship between said plurality of optoelectrical conversion elements and a plurality of kinds of color filters, to an external device; and
an output device including:
   a decoding circuit for decoding a plurality of transmitted color signals from the transmitting portion of said input device;
   a color signal converting circuit for converting a plurality of the decoded color signals which are input as one kind of color signal per pixel into a plurality of color signals different from said decoded color signals for output as at least one kind of color signal per pixel different from the input kind of color signal per pixel; and
   a printing portion for displaying or printing said plurality of converted color signals, wherein:
said color signal converting circuit includes an edge detection circuit which performs detection of an edge portion in said plurality of transmitted color signals and detection of pixels located on said edge portion, and generates a plurality of converted color signals by combining different kinds of color signals of adjacent pixels in a non-edge portion or generates a plurality of converted color signals are generated by using color signals of peripheral regions in said edge portion; and
said edge detection circuit includes a difference vector calculating means combining a plurality of kinds of color signals, and a comparator for comparing with a predetermined threshold value.

2. An image signal processing system comprising:
an input device including:
   filter means of a plurality of kinds of spectrum distributions in a plurality of optoelectrical conversion elements on a plane;
   a sensor for reading an object and outputting a plurality of color signals;
   an analog to digital (AD) converter for performing AD conversion of a plurality of color signals from said sensor;
   an encoding circuit for encoding a plurality of the AD converted color signals;
   a memory for storing the encoded color signals;
   a transmitting portion for transmitting a plurality of the stored color signals from said memory and a color arrangement information indicative of a relationship between said plurality of optoelectrical conversion elements and a plurality of kinds of color filters, to an external device; and
an output device including:
   a decoding circuit for decoding a plurality of transmitted color signals from the transmitting portion of said input device;
   a color signal converting circuit for converting a plurality of the decoded color signals which are input as one kind of color signal per pixel into a plurality of color signals different from said decoded color signals for output as at least one kind of color signal per pixel different from the input kind of color signal per pixel; and
   a printing portion for displaying or printing said plurality of converted color signals, wherein:
said color signal converting circuit includes an edge detection circuit which performs detection of an edge portion in said plurality of transmitted color signals and detection of pixels located on said edge portion, and generates a plurality of converted color signals by combining different kinds of color signals of adjacent pixels in a non-edge portion or generates a plurality of converted color signals by using color signals of peripheral regions in said edge portion;
said edge detection circuit includes a difference vector calculating means combining a plurality of kinds of color signals, and a comparator for comparing with a predetermined threshold value, and
said difference vector calculating means calculates a difference vector using a difference signal generated in decoding procedure using difference encoding system.

3. An image signal processing system comprising:
an input device including:
   filter means of a plurality of kinds of spectrum distributions in a plurality of optoelectrical conversion elements on a plane;
   a sensor for reading an object and outputting a plurality of color signals;
   an analog to digital (AD) converter for performing AD conversion of the plurality of color signals read by said sensor;
   an encoding circuit for encoding a plurality of the AD converted color signals;
   a memory for storing the encoded color signals;
   a transmitting portion for transmitting a plurality of the stored color signals from said memory and a color arrangement information indicative of a relationship between said plurality of optoelectrical conversion elements and a plurality of kinds of color filters, to an external device; and
an output device including:
   a decoding circuit for decoding a plurality of transmitted color signals from the transmitting portion of said input device;
   a color signal converting circuit for converting a plurality of the decoded color signals which are input as one kind of color signal per pixel into a plurality of color signals different from said decoded color signals for output as at least one kind of color signal per pixel different from the input kind of color signal per pixel;
means for calculating n ($n \geq 1$) in number of color signals relating to r ($r \geq 3$> kind of colors depending upon an output format of said output device) from m ($m \geq 1$) in number of color signals relating to s ($s \geq 3$) kinds of colors output from said input device; and
a printing portion for displaying or printing said plurality of converted color signals.

* * * * *